(12) United States Patent
Priepke

(10) Patent No.: US 7,810,304 B2
(45) Date of Patent: *Oct. 12, 2010

(54) COMPACT KNIFE HEAD ASSEMBLY, BEARING AND ECCENTRIC FOR A SICKLE DRIVE FOR A HEADER OF AN AGRICULTURAL PLANT CUTTING MACHINE

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 265 days.

This patent is subject to a terminal disclaimer.

(21) Appl. No.: 11/999,578

(22) Filed: Dec. 6, 2007

(65) Prior Publication Data

US 2009/0145097 A1   Jun. 11, 2009

(51) Int. Cl.
*A01D 34/30* (2006.01)
(52) U.S. Cl. ...................................................... 56/257
(58) Field of Classification Search .................... 56/123, 56/155, 158, 232, 242, 246, 248, 257–288, 56/316, 17.6, 296, 304
See application file for complete search history.

(56) References Cited

U.S. PATENT DOCUMENTS

| | | | |
|---|---|---|---|
| 843,961 A * | 2/1907 | McCarty | 56/261 |
| 1,980,527 A | 11/1934 | Hewton | 74/55 |
| 2,569,507 A | 10/1951 | von Schlegell | 60/54.5 |
| 3,538,690 A | 11/1970 | Hinks | 56/26.5 |
| 3,937,089 A | 2/1976 | Gartner | 74/25 |
| 3,973,378 A * | 8/1976 | Bartasevich et al. | 56/11.9 |
| 4,222,619 A | 9/1980 | Nilsson | 308/176 |
| 4,838,014 A | 6/1989 | Koch et al. | 56/13.6 |
| 4,838,114 A | 6/1989 | Stidworthy | 74/568 R |
| 4,909,025 A * | 3/1990 | Reissig et al. | 56/257 |
| 5,155,914 A * | 10/1992 | Ohkanda | 30/369 |
| 7,121,074 B1 * | 10/2006 | Regier et al. | 56/296 |
| 7,313,903 B2 * | 1/2008 | Schumacher et al. | 56/304 |

FOREIGN PATENT DOCUMENTS

CH  671136  8/1989

\* cited by examiner

*Primary Examiner*—Thomas B Will
*Assistant Examiner*—Joan D Misa
(74) *Attorney, Agent, or Firm*—Michael G. Harms; Patrick M. Sheldrake

(57) ABSTRACT

A compact epicyclic drive includes a pinion rotatable about a ring gear and an eccentric element fixedly connected to the pinion so as to be rotated thereby, a knife head bearing supported on and extending around the eccentric element, and a knife head assembly connected in driving relation to a sickle knife assembly. The knife head assembly includes an element supported on and extending around the knife head bearing and configured so as to transfer sidewardly directed components of rotations of the eccentric element into sideward reciprocating movements of the sickle knife assembly. The eccentric element, knife head bearing, and knife head assembly are generally flat and axially coextensive, contributing to the compactness of the drive. The sickle drive is adapted to incorporated into or beneath a floor or pan of a header of an agricultural harvesting machine.

22 Claims, 20 Drawing Sheets

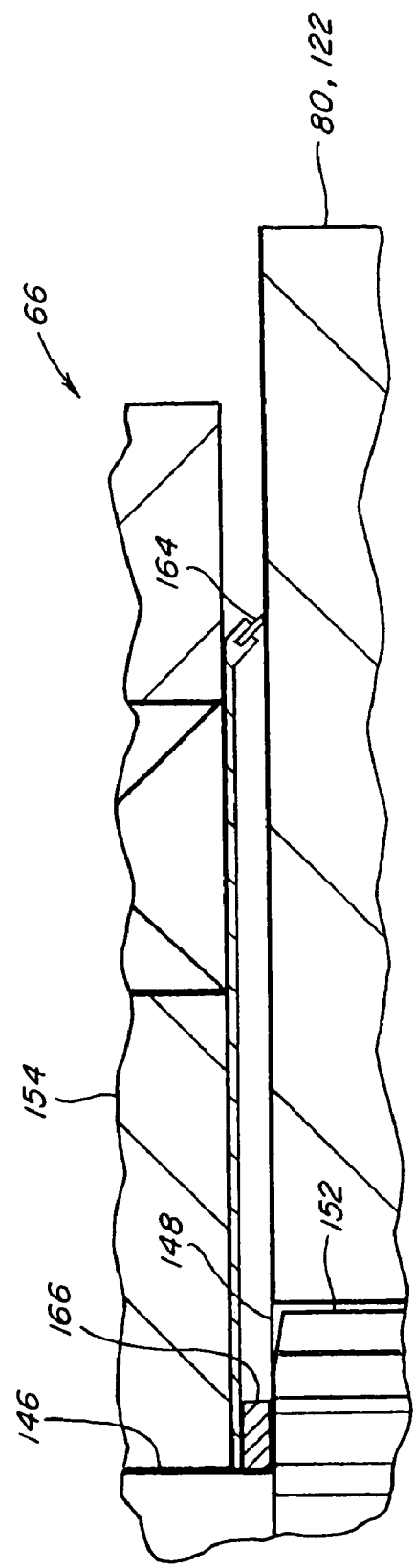

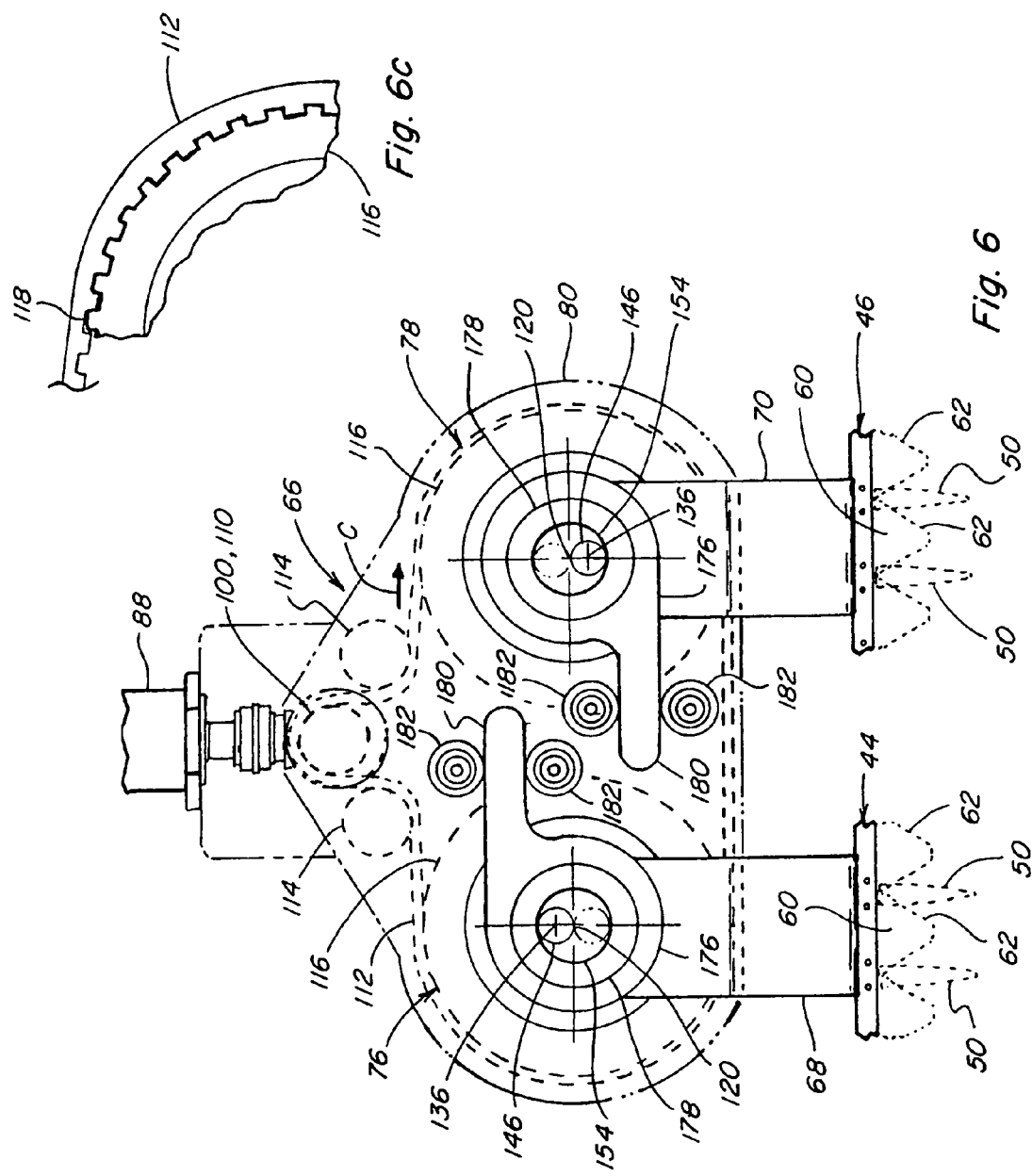

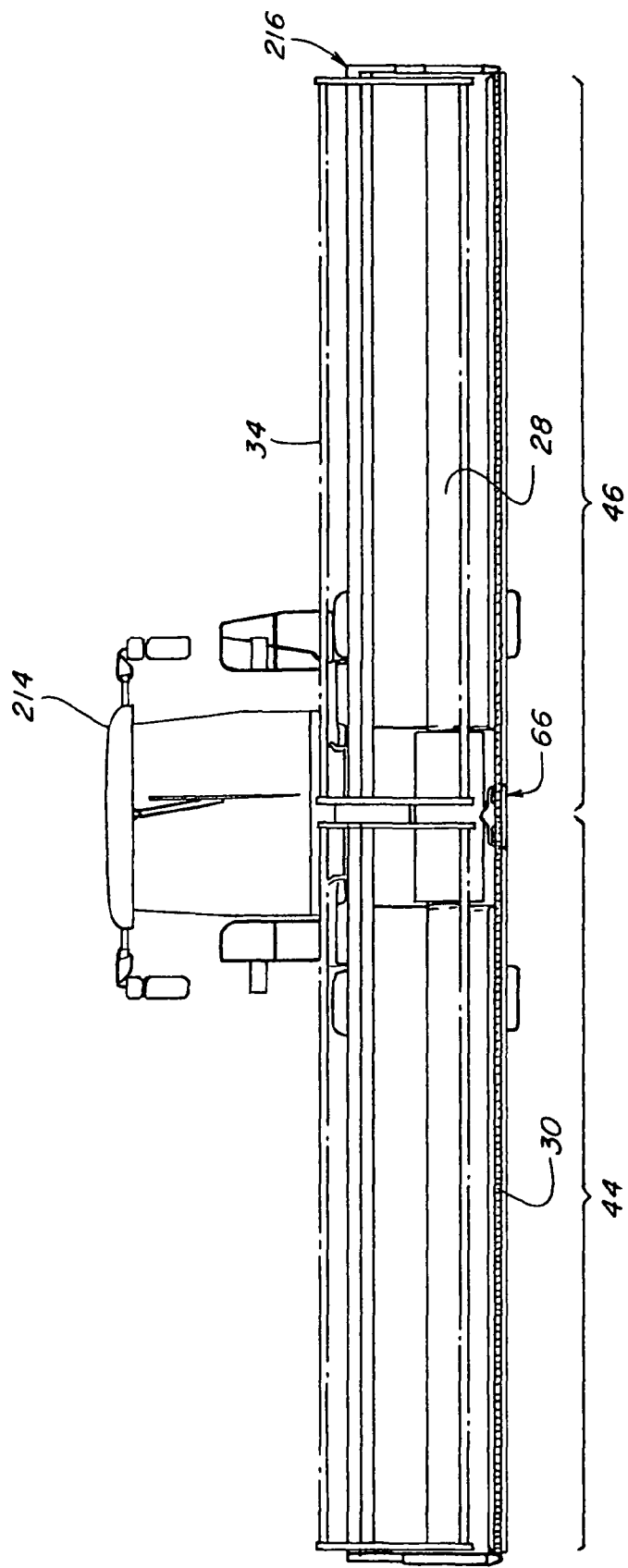

COMPACT KNIFE HEAD ASSEMBLY, BEARING AND ECCENTRIC FOR A SICKLE DRIVE FOR A HEADER OF AN AGRICULTURAL PLANT CUTTING MACHINE

TECHNICAL FIELD

This invention relates generally to a drive for the sickle of a header of an agricultural cutting machine, such as a combine, windrower or other crop harvesting machine, or a mower, and more particularly, to a drive mechanism utilizing at least one epicyclic drive having an eccentric, knife head assembly, and bearing connecting the two, which are generally vertically coextensive and compact, to facilitate incorporation of the drive into or beneath a floor or pan of a header.

BACKGROUND ART

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

The knife assembly is driven reciprocatingly longitudinally by an oscillating drive, which can include, but is not limited to, an eccentric shaft on a rotating hub, a wobble drive, or a similar well known commercially available device. Such drives are typically located at the sides of the header, so as to drive the knife assembly from the end. This location is advantageous as it allows the driving point for the knife assembly to be in line with the stationary bar, provides clearances for removal of the knife assembly, and provides space for assembly of the drive. Disadvantages of the side location include that the header must include significant frame structure for supporting the drive and to withstand forces and vibrations generated thereby. The end structure or crop divider at the end of the header must also be relatively wide, to accommodate the drive and to direct adjacent standing crops therepast, and increasing the possibility of accidentally pushing down adjacent standing crops. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

A knife assembly, which will weigh from 35 to 38 pounds for a typical 20 foot wide header, typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. These high forces can have at least two negative effects, vibration at the drive system that may be transmitted to other components of the machine, and fatigue failure of the structural components themselves. On larger headers, for instance, headers 30 feet wide and greater, two knife assemblies each equal to one-half the sideward extent of the header are often used.

Driving a knife assembly or assemblies of a header from a more central location, such as the center of the header, would provide several advantages compared to a side location. Notably among these advantages, the header structure would not be required to support heavy drive units on one or both sides, such that the structure of the header could be lighter. Long timing apparatus extending between the ends could also be eliminated. If the drive mechanism could be incorporated into a location that would not interrupt or require dividing crop or plant material flow through the crop flow area of the header, the normal crop flow of the header would not be significantly impacted. And, since the drives are not located in the ends, the end dividers can be made significantly thinner, such that the header can have a shorter overall width, would be more easily maneuverable in relation to adjacent standing crop, and danger of downing the adjacent standing crop would be reduced.

Thus, what is sought is a drive for a sickle of a header of an agricultural cutting machine, such as a combine or windrower, which overcomes one or more of the problems, negative effects, and disadvantages referenced above.

SUMMARY OF THE INVENTION

What is disclosed is a compact drive mechanism for a sickle of an agricultural cutting machine, such as a combine, windrower, or other crop harvesting machine, which overcomes one or more of the problems, negative effects, and disadvantages set forth above.

According to a preferred aspect of the invention, the compact drive mechanism is adapted to be located beneath, or incorporated into, a floor or pan of a header at a location spaced from the sides or ends of the header, such that cut crops or other plant material can flow over and around the drive mechanism and not be obstructed thereby. The drive mechanism of the invention is preferably configured for driving two knife assemblies of a sickle disposed in end to end relation, reciprocatingly in opposite directions, such that forces generated by the moving masses of the drive mechanism and the two knife assemblies, including forces resulting from moments, are at least substantially completely contained within the structure of the drive mechanism, and therefore are not directed to structure of the header. As a result, large, heavy drive units and support structure adequate for withstanding vibrations and high back and forth forces, are eliminated from the sides or ends of the header, as is timing apparatus for connecting the drives, and the crop dividers on the sides can be narrower.

According to another preferred aspect of the invention, the compact sickle drive mechanism includes two epicyclic drives, one for each of two knife assemblies of a sickle. The epicyclic drive for driving each knife assembly includes an input element supported beneath the floor or pan for rotation about a central rotational axis through the input element, and a pinion gear supported in connection with the input element for rotation relative thereto about an eccentric axis offset from and parallel to the central rotational axis. The epicyclic drive includes a fixed ring gear, mounted on a frame or mounting structure of the drive, which ring gear is concentric with the input element and enmeshed with the pinion gear such that rotation of the input element about the central rotational axis will cause the pinion gear to rotate around the ring gear about the central rotational axis and simultaneously rotate about the eccentric axis, in essentially an orbiting movement. The epicyclic drive includes an eccentric element fixedly connected to the pinion gear so as to be rotated thereby eccentrically about the ring gear and the central rotational axis when the input element is rotated. And the drive includes a knife head driver element connected to the knife assembly and supported for sideward movement therewith along the forward edge portion of the floor. The knife head driver element is rotatably connected to the eccentric element by a knife head assembly. The knife head assembly includes an element which extends around the eccentric element and is configured so as to transfer sidewardly directed components of the eccentric rotations of the eccentric element into sideward reciprocating movements of the knife assembly, and rollers or another element or elements that restrain and guide the movements of the element. The eccentric element and knife head assembly are vertically coextensive, so as to contribute to the overall compactness of the drive mechanism. And, the eccentric element has a sufficient diametrical extent so as to accommodate the sideward extent of movement of the knife assemblies.

Preferably, the two epicyclic drives are mounted in side by side relation, and are connected in reciprocatingly driving relation to two knife assemblies, respectively, preferably supported in end to end relation adjacent to the front edge portion of the floor or pan of a header, for simultaneously moving the knife assemblies reciprocatingly in opposite sideward directions. The timing also causes the eccentric elements of the respective drives to eccentrically rotate in timed relation, such that radial forces generated by imbalances of the respective eccentric elements are also at least substantially cancelled, resulting in the net overall forces and vibrations emanating from the two drives and knife assemblies being greatly reduced or even substantially eliminated.

According to another preferred aspect of the invention, the drive mechanism is configured such that the two epicyclic drives are jointly driven by a common drive, preferably in timed relation one to the other using a timing belt drive, chain drive and/or gear drive. The common drive can be a motor, such as a fluid or electric motor, a PTO shaft, or the like.

Still further, as another preferred aspect of the invention, the compact drive mechanism is configured such that the two epicyclic drives are commonly supported on a support frame or structure, and are commonly housed. As another preferred aspect, the epicyclic drives of the invention can also be supported in connection with the knife assemblies, for instance, mounted in connection with the rear ends thereof, so as to be movable upwardly and downwardly therewith relative to the floor or pan of the header, in a floating operating mode, to move forwardly and rearwardly therewith if used on a variable floor type header, and to allow some angular movement of the knife assemblies if used on a flex header.

As examples of preferred embodiments according to the invention, for a wide range of typical agricultural combine grain header having a width of from about 20 to about 40 feet, a compact drive mechanism located at about the center of the header, spaced equally from the opposite ends, and including two epicyclic drives, can be used. Each epicyclic drive would be connected to a knife assembly having a length equal to about one half the width of the header. Or, for a wider combine grain header within this range, for instance, having a width of from about 36 (to about 40 feet, it is contemplated that two compact drive mechanisms each including two epicyclic drives could be used, each epicyclic drive being connected to a knife assembly having a length equal to about one fourth the width of the header. This latter arrangement would also have particular utility for draper headers, that is, headers having elongate moving belts which convey plant material sidewardly toward a central belt which conveys the plant material rearwardly into a feeder of a combine, or into windrowing apparatus of a windrower. As still another example, when a drive mechanism of the invention is used with a shorter and/or lighter weight sickle, the drive can be operated at a higher reciprocating speed, to allow operation of the harvesting machine at a higher ground speed.

BRIEF DESCRIPTION OF THE DRAWINGS

FIG. 5a is an enlarged fragmentary sectional view of a portion of the drive mechanism of FIG. 5, illustrating a dust cover thereof;

FIG. 6 is a top view of the drive mechanism of FIG. 1, illustrating elements thereof in a first representative operating position;

FIG. 6c is a fragmentary top view of the drive mechanism of FIG. 6, illustrating a timing drive belt;

FIG. 13 is a forward end view of a conventional windrower including a header having a compact sickle drive mechanism according to the present invention.

DETAILED DESCRIPTION OF THE INVENTION

Figure 1:
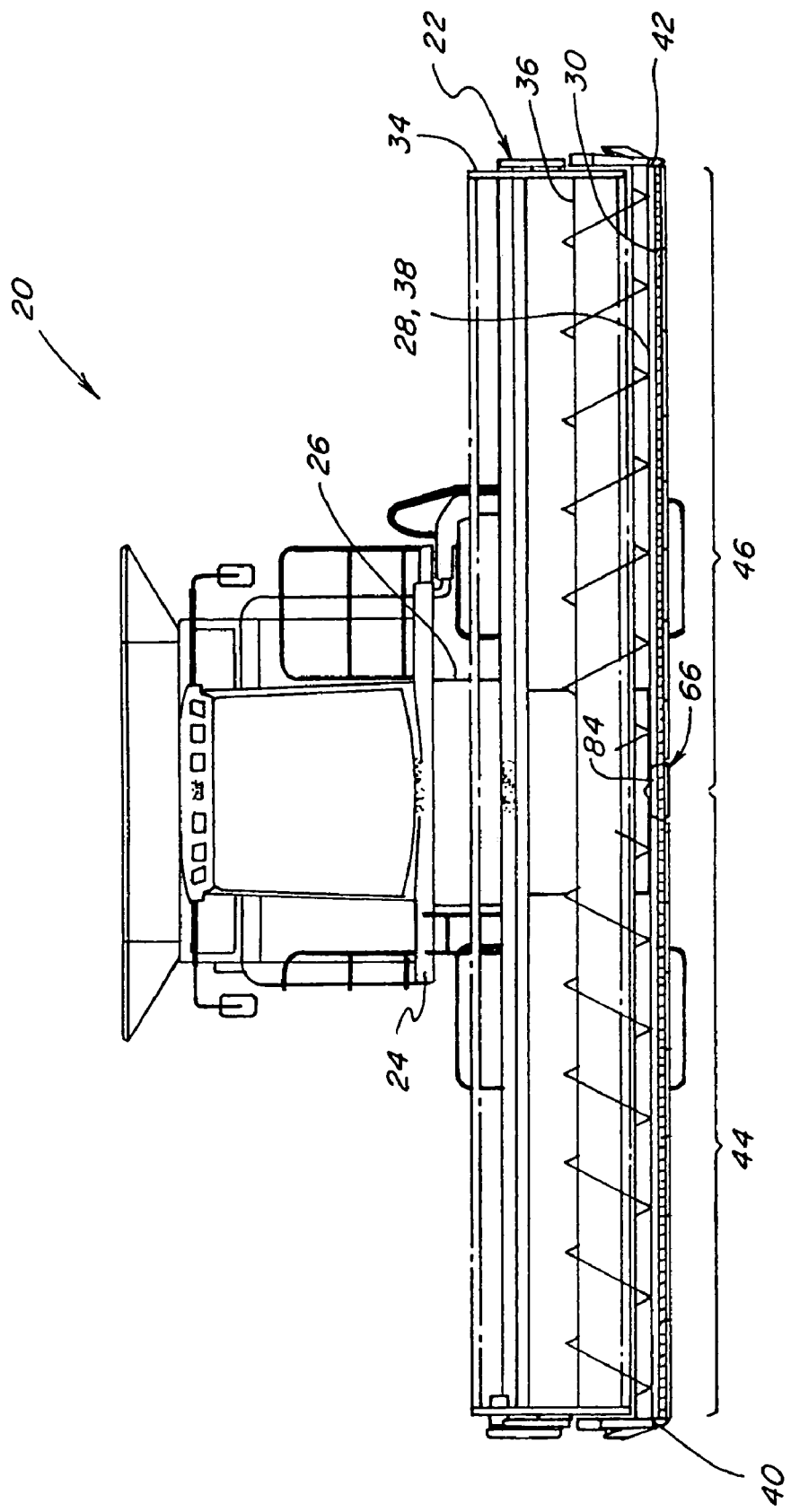
FIG. 1 is a forward end view of a combine including a header having a compact sickle drive mechanism according to the present invention.

Turning now to the drawings wherein several preferred embodiments of the invention are shown, in FIG. 1, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Figure 2:
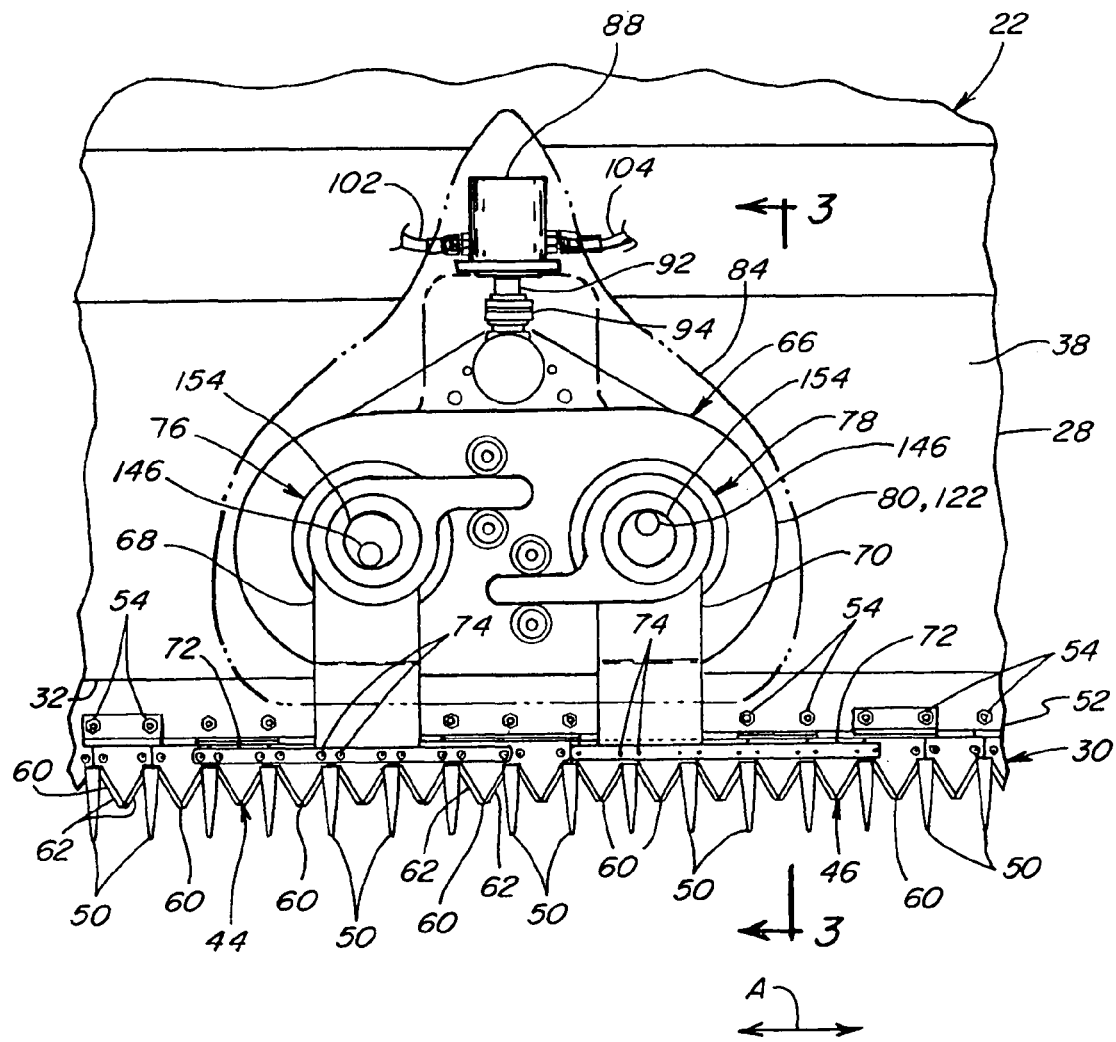
FIG. 2 is an enlarged fragmentary top view of the header of FIG. 1, with a cover and an upper bearing assembly removed to show other aspects of the drive mechanism of FIG. 1.
Figure 3:
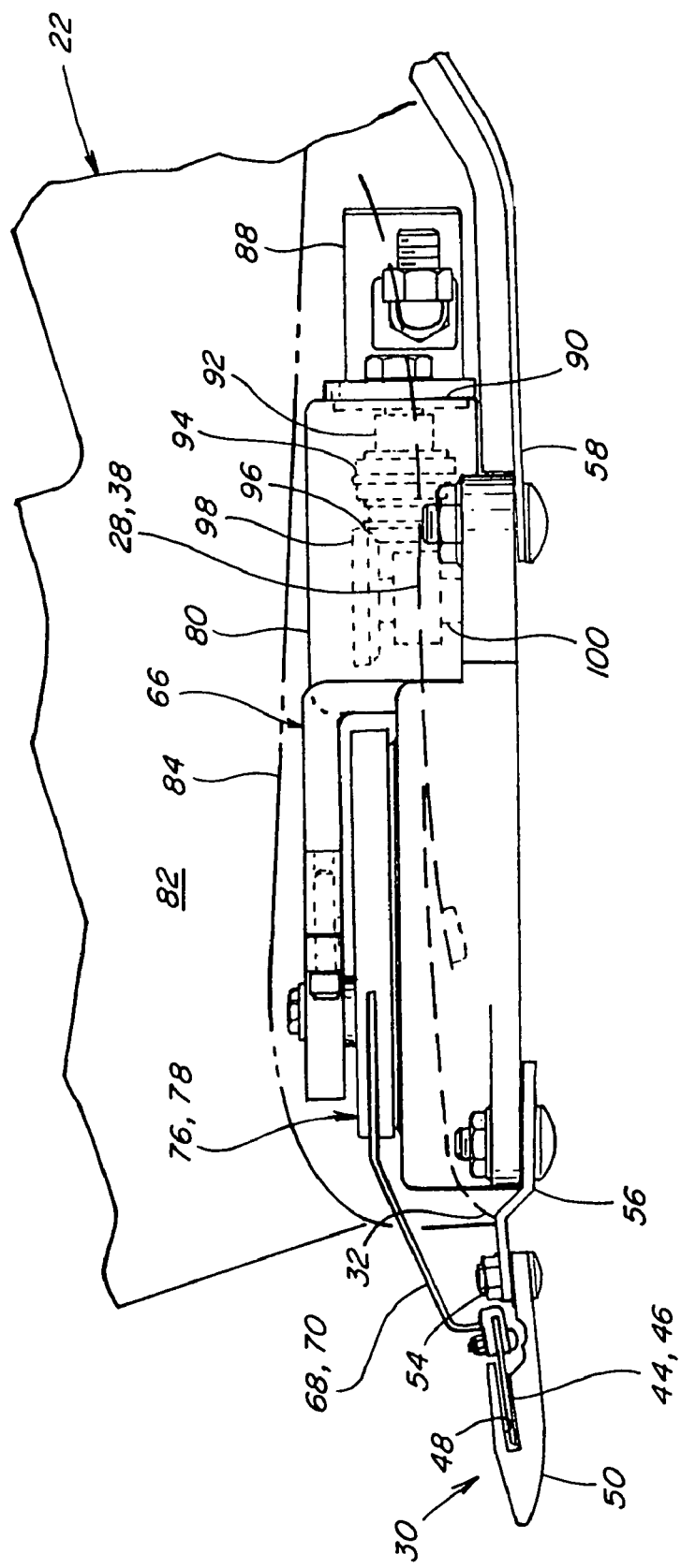
FIG. 3 is an enlarged fragmentary sectional view of the header taken generally along line 3-3 of FIG. 2, and with the cover and a floor of the header in phantom to reveal the drive mechanism.

Referring also to FIGS. 2 and 3, header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the crop for induction into header 22, as will be explained. Header 22 additionally includes an elongate, sidewardly extending reel 34 (FIG. 1) disposed above sickle 30 and rotatable in a direction for facilitating induction of the severed crops into header 22. An elongate, rotatable auger 36 (shown in outline form in FIG. 1) that extends in close proximity to a top surface 38 of floor 28 and has helical flights therearound (not illustrated) is operable in cooperation with reel 34 for conveying the severed crops toward an inlet opening of feeder 26 for induction into combine 20, in the well-known manner.

Referring more particularly to FIG. 1, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Referring more particularly to FIGS. 2 and 3, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 58 at the bottom of header 22, as also illustrated in FIG. 3. Each of cutter bar assemblies 44 and 46 supports an elongate knife assembly 60 for reciprocating longitudinal movement within slots 48, each knife assembly 60 including a row of knife sections including oppositely facing, angularly related knife edges 62 which, in conjunction with adjacent guards 50, effects a shearing or cutting action which severs plant stems and stalks or other material captured between the knives and the guards as the knife sections are reciprocatingly moved sidewardly, as denoted by arrows A.

As noted above under the Background Art heading, it is desirable to reduce negative effects of the reciprocating sideward motion of knife assemblies 60, including, but not limited to, vibration, fatigue failure, and the like, and also the disadvantages of known structures for effecting the motion, including the need for substantial structure for supporting drive mechanisms on the sides of headers, the increased width of side dividers containing the mechanism, and apparatus for timing drive mechanisms located on opposite sides of a header.

Reduction of these negative effects and disadvantages is achieved according to the present invention by utilizing a compact sickle drive mechanism 66 constructed and operable according to the teachings of the present invention. Sickle drive mechanism 66 is illustrated in FIG. 1 at a location on header 22 between side edge portions 40 and 42 which is at about the center of header 22, although it should be noted that it is contemplated that sickle drive mechanism 66 could alternatively be utilized at other locations on a header such as header 22, and that multiple sickle drives 66 could be used on a header, as described and illustrated later herein.

Figure 3A:
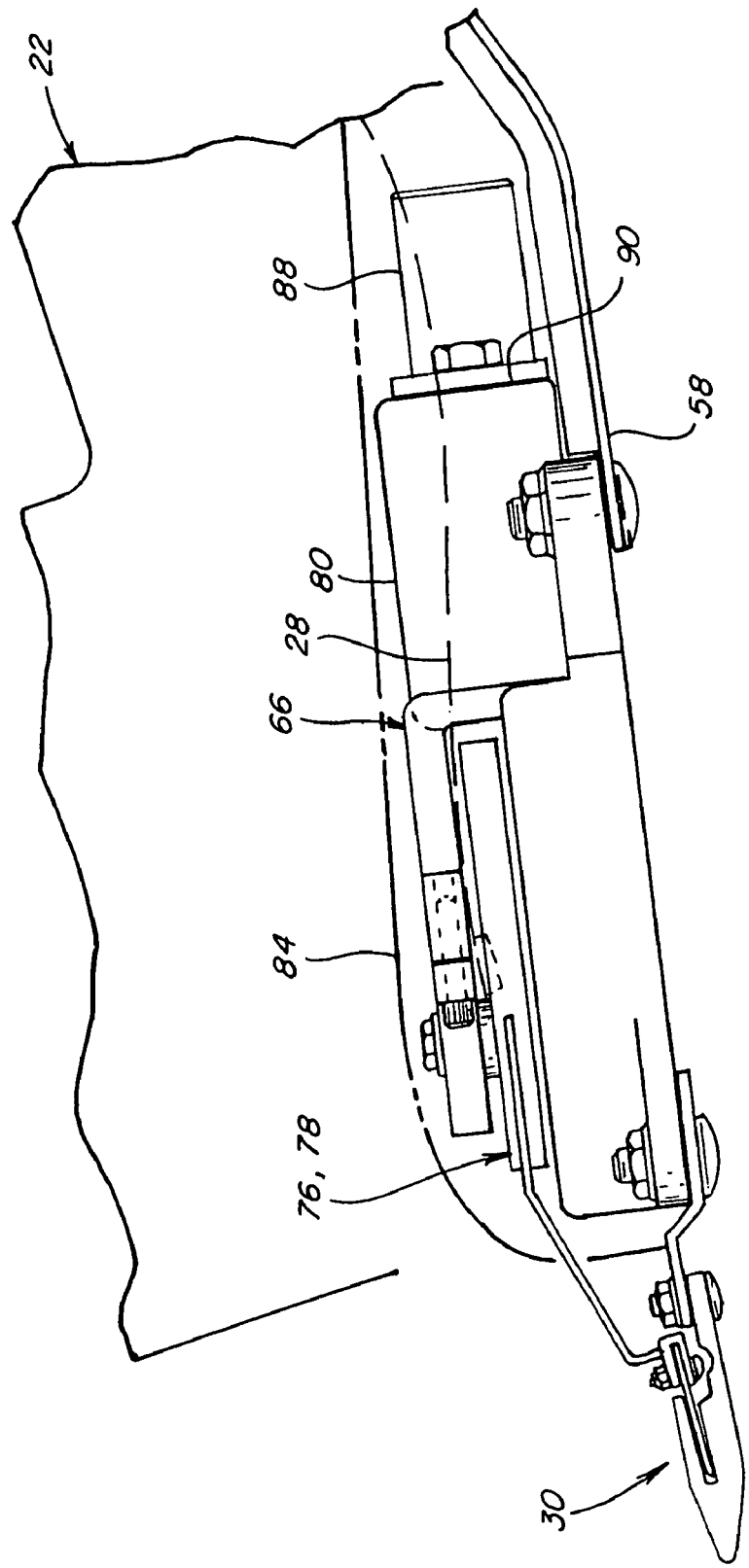
FIG. 3a is another enlarged fragmentary sectional view of the header taken generally along line 3-3 of FIG. 2, with the sickle and drive mechanism moved vertically relative to the floor of the header to illustrate utility of the invention for headers having a floating capability.
Figure 4:
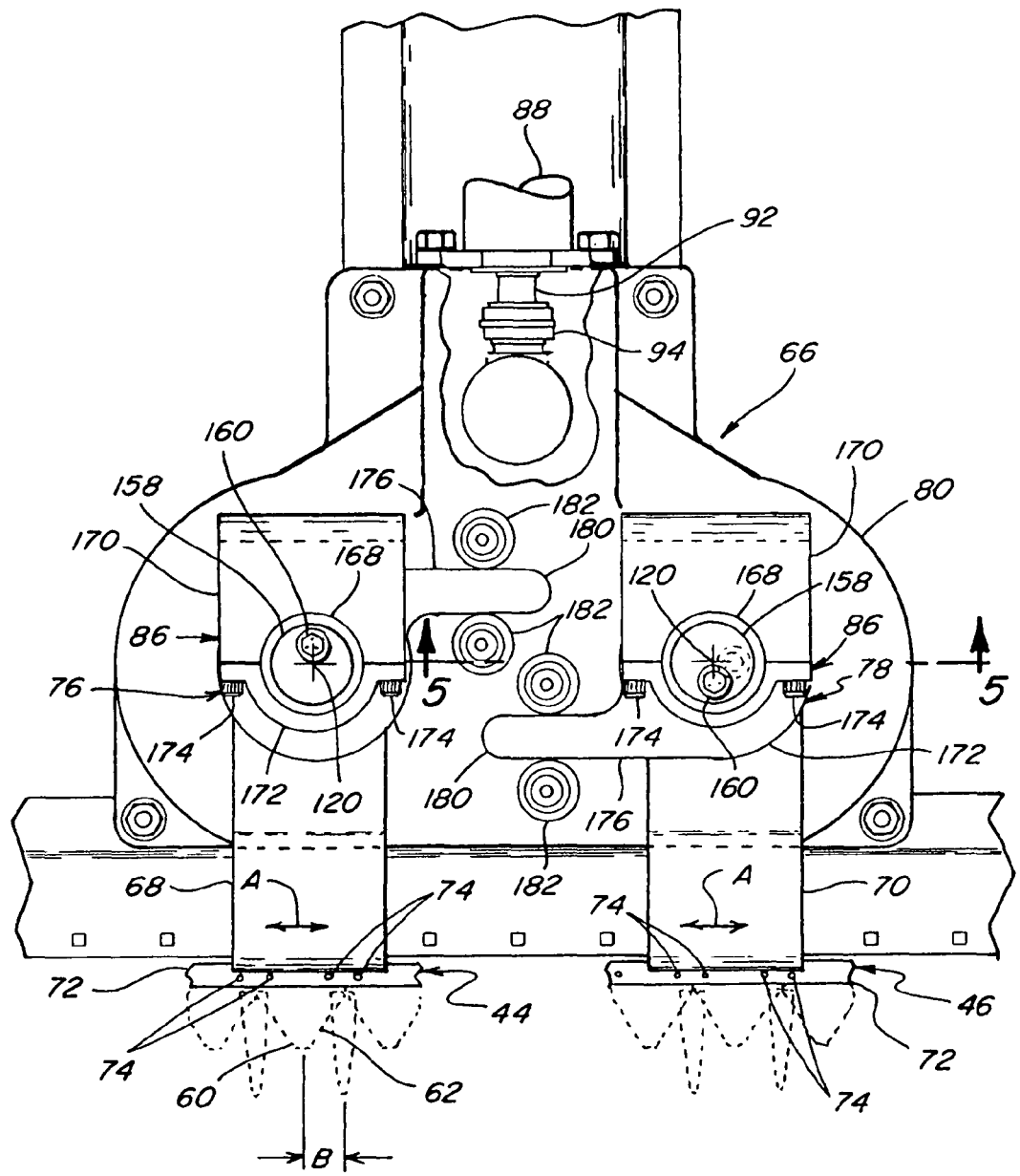
FIG. 4 is a top view of the drive mechanism of FIG. 1, showing the upper bearing assemblies in place.

Referring also to FIGS. 3, 3a and 4, compact sickle drive mechanism 66 includes a first knife head driver element 68 in connection with the knife assembly 60 of first cutter bar assembly 44, and a second knife head driver element 70 in connection with the knife assembly 60 of second cutter bar assembly 46, knife head driver elements 68 and 70 being simultaneously operable by drive mechanism 66 for reciprocatingly driving the knife assemblies 60 of respective cutter bar assemblies 44 and 46 sidewardly, as illustrated by arrows A, in timed relation so as to move in opposite sideward directions. That is, as knife assembly 60 of first cutter bar assembly 44 is moved in one sideward direction, knife assembly 60 of second cutter bar assembly 46 will be moved in the opposite sideward direction. The length of the sideward movements, or strokes, will be sufficient for providing the desired cutting action, which will typically be equal to about the sideward extent of a knife edge 62 of a typical knife section, as generally denoted by distance B in FIG. 4. First and second knife head driver elements 68 and 70 are preferably constructed of a sheet or cast metal bent or formed to a sectional shape about as shown, and are connected to knife assemblies 60 of the respective cutter bar assemblies 44 and 46 in a suitable manner, here using sidewardly extending elongate bars 72 on the forward ends of driver elements 68 and 70, which connect to the knife assemblies 60 with suitable fasteners such as screws 74 or the like. Here, it should be noted that it is desired for the knife assemblies 60 to move only in the sideward directions relative to stationary bar 52, and not forwardly, rearwardly, upwardly or downwardly to any significant extent relative thereto. This is achieved at least in large part by the containment of knife assemblies 60 in slots 48 of stationary bar 52, although other constructions for holding the knife head assemblies could be used. Because driver elements 68 and 70 are rigidly connected with knife assemblies 60, respectively, driver elements 68 and 70 are also restricted to sideward movements only.

Compact drive mechanism 66 includes a first epicyclic drive 76 connected in driving relation to first knife head driver element 68, and a second epicyclic drive 78 connected in driving relation to second knife head driver element 70, epicyclic drives 76 and 78 being contained in a compact common housing 80 of drive mechanism 66 mounted, for instance, on frame 58 of header 22. It is contemplated and preferred that compact sickle drive mechanism 66 be incorporated in or beneath floor 28 of header 22, sufficiently such that cut plant material, particularly crops, cut by those portions of cutter bar assemblies 44 and 46 forwardly of drive mechanism 66 will be able to relatively smoothly and uninterruptedly flow over and around drive mechanism 66 so as to enter a plant or crop flow area 82 above floor 28, and so as to subsequently be conveyed, for instance, by reel 34 and auger 36, to the inlet of feeder 26 of combine 20. To facilitate this, drive mechanism 66 is vertically compact, preferably having a vertical extent of no more than about six inches, and is preferably disposed beneath and covered by a smooth, low profile, streamlined upper cover 84 which preferably is of sheet metal or similar construction and forms a part of floor 28 and top surface 38 thereof at the center of header 22. Cover 84 preferably has a forwardly facing slot or slots through which driver elements 68 and 70 extend, but which slots are sufficiently narrow to as to at least substantially prevent passage of cut plant material through the slot or slots and into the interior of cover 84. Here, it should be noted that epicyclic drives 76 and 78 each preferably includes an upper bearing assembly 86 (deleted in FIG. 2 to reveal other aspects of the drives), which is illustrated in FIGS. 3, 3a and 4 as being external to housing 80, but which, alternatively, could be incorporated within the housing 80. The bottom region of housing 80 is also preferably enclosed, to prevent entry of contaminants into the interior thereof.

In FIG. 3a, frame 58, sickle 30, compact drive mechanism 66 and cover 84 are shown in a lowered position relative to floor 28, for facilitating a floating sickle capability, and illustrates the adaptability of drive mechanism 66 for use with a header such as header 22 having this capability. Here, it is contemplated that this feature would have utility for use when harvesting grains, such as soybeans, wherein a floating capability is typically used. Alternatively, frame 58, sickle 30 and drive mechanism 66 can be fixed and locked in a raised position, as illustrated in FIG. 3, as would typically be used for harvesting wheat. Additionally, the apparatus of the invention can be configured for use with flexible sickles or cutter bars assemblies, for instance, by allowing some sideward twisting or rotation of the structure such as frame 58 supporting mechanism 66. And, the apparatus of the invention can be configured for use with variable floor headers wherein the cutter bar assembly and possibly a leading edge of the floor is fore and aft movable relative to the more rearward region of the floor.

Knife assemblies 60 are preferably reciprocatingly driven in timed relation by the respective epicyclic drives 76 and 78 so as to move in opposite sideward directions, such that forces generated by the moving masses of the knife assemblies are at least substantially contained within the structure of the invention, thereby substantially reducing or eliminating transfer of vibrations to the structure of header 22, and, from there to combine 20. Preferably, a common power source is used, which can be, but is not limited to, a fluid motor 88. Fluid motor 88 is illustrated as being mounted to a rear end 90 of housing 80. Fluid motor 88 is connected in rotatably driving relation to a horizontal rotatable input shaft 92 supported by a bearing 94 mounted within housing 80, and in connection with a bevel gear 96 enmeshed at a right angle with a second bevel gear 98. Second bevel gear 98, in turn, is mounted in connection with a vertical input shaft 100 mounted within housing 80. Fluid motor 88 is connected to a source of pressurized fluid and a fluid reservoir (not shown) on combine 20 in the conventional, well-known manner, via fluid lines 102 and 104 (FIG. 2) and is operable for rotating input shaft 92, which in turn rotates bevel gears 96 and 98 to rotate shaft 100. This provides the power to first and second epicyclic drives 76 and 78, which are configured to translate the power into the sideward reciprocating movements of first and second knife head driver elements 68 and 70, and thus of knife assemblies 60, as will be explained.

Figure 4A:
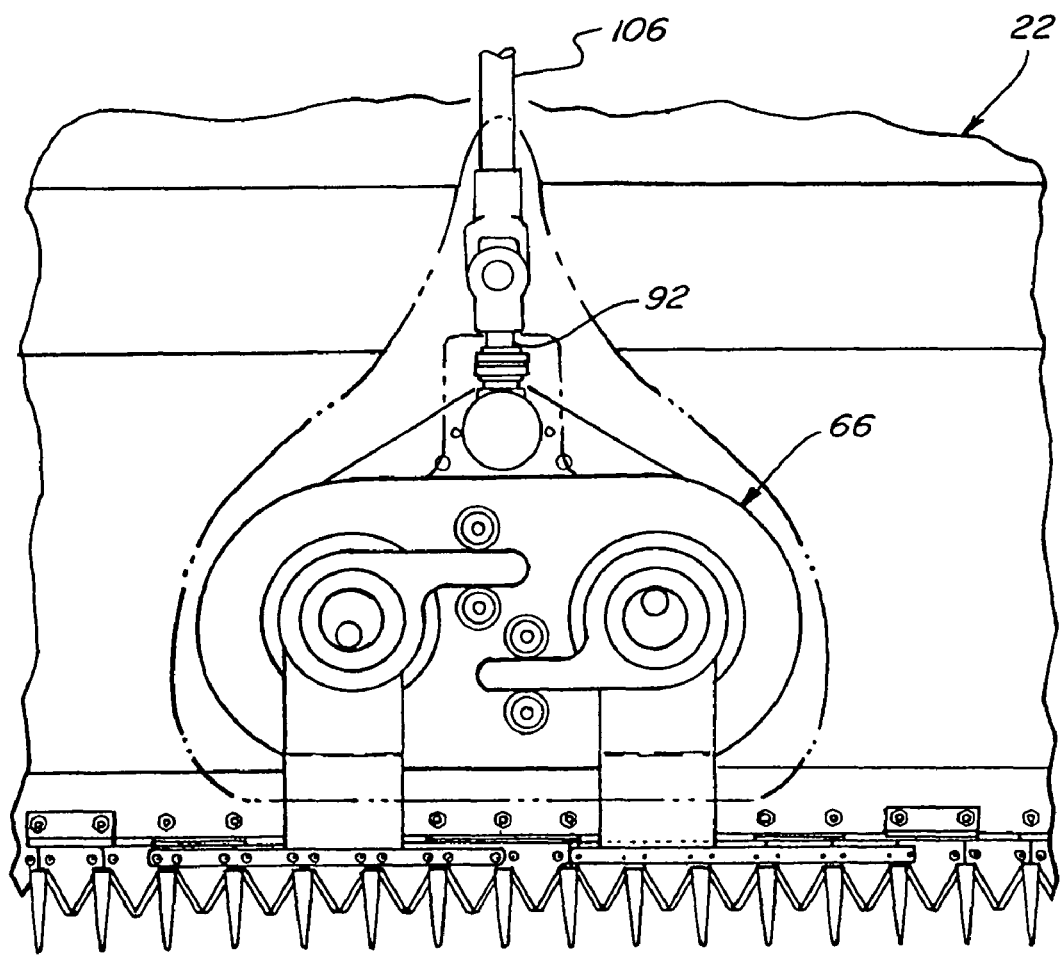
FIG. 4a is a top fragmentary view of the header and drive mechanism of FIG. 1, illustrating connection of the drive mechanism with an alternative power source which is a PTO shaft.
Figure 4B:
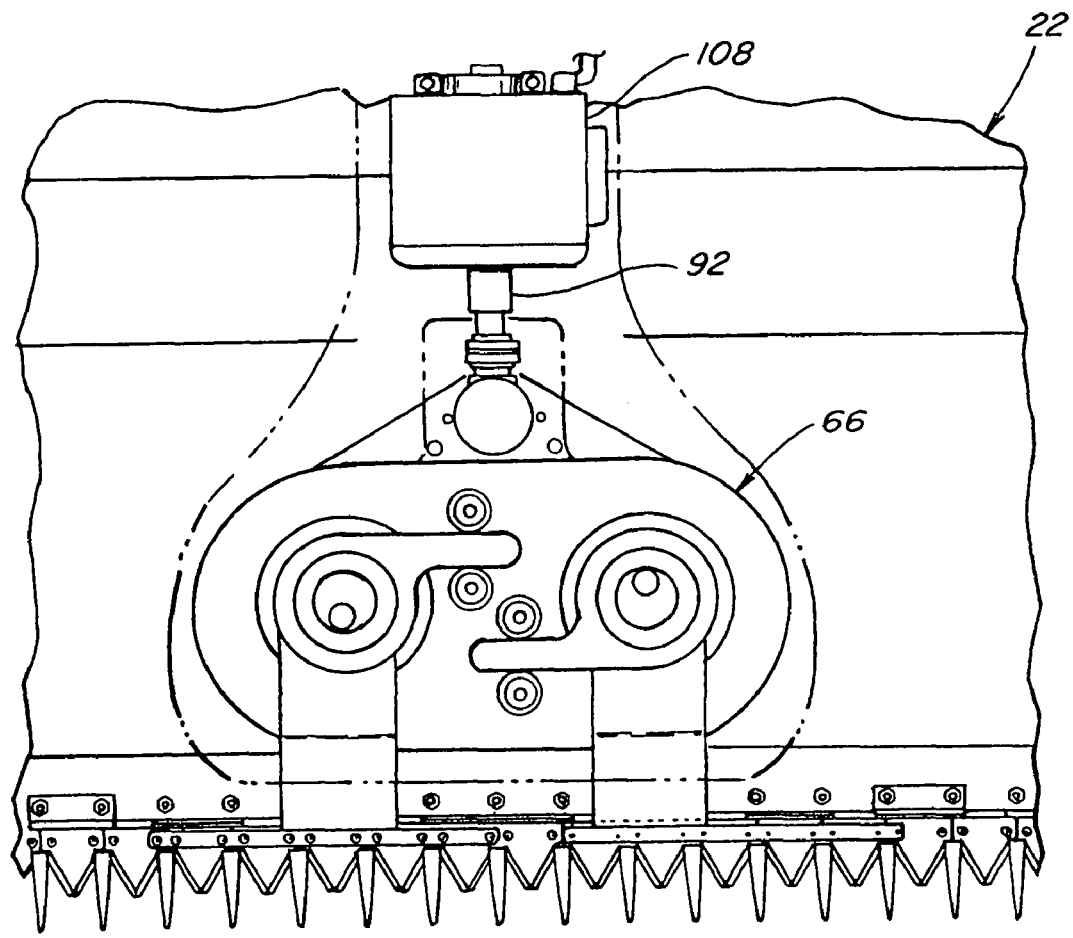
FIG. 4b is another top fragmentary view of the header and drive mechanism of FIG. 1, illustrating connection of the drive mechanism with another alternative power source which is an electric motor.

Referring also to FIGS. 4a and 4b, as noted above, drive mechanism 66 can be driven by an alternative power source, which can include, but is not limited to, a PTO shaft 106 (FIG. 4a), or an electric motor 108 (FIG. 4b), or other common driver such as a belt or chain (not shown) or a combination of such drives. In either of the illustrated instances, the alternative power source 106 or 108 can be connected in rotatably driving relation to drive mechanism 66 via an input shaft 92 or other suitable manner of connection. Here, it should be noted that the right angle drive capability provided by bevel gears 96 and 98 facilitates vertical compaction of drive mechanism 66. And, as an alternative, it should be noted that first and second epicyclic drives 76 and 78 could be driven separately.

Figure 5:
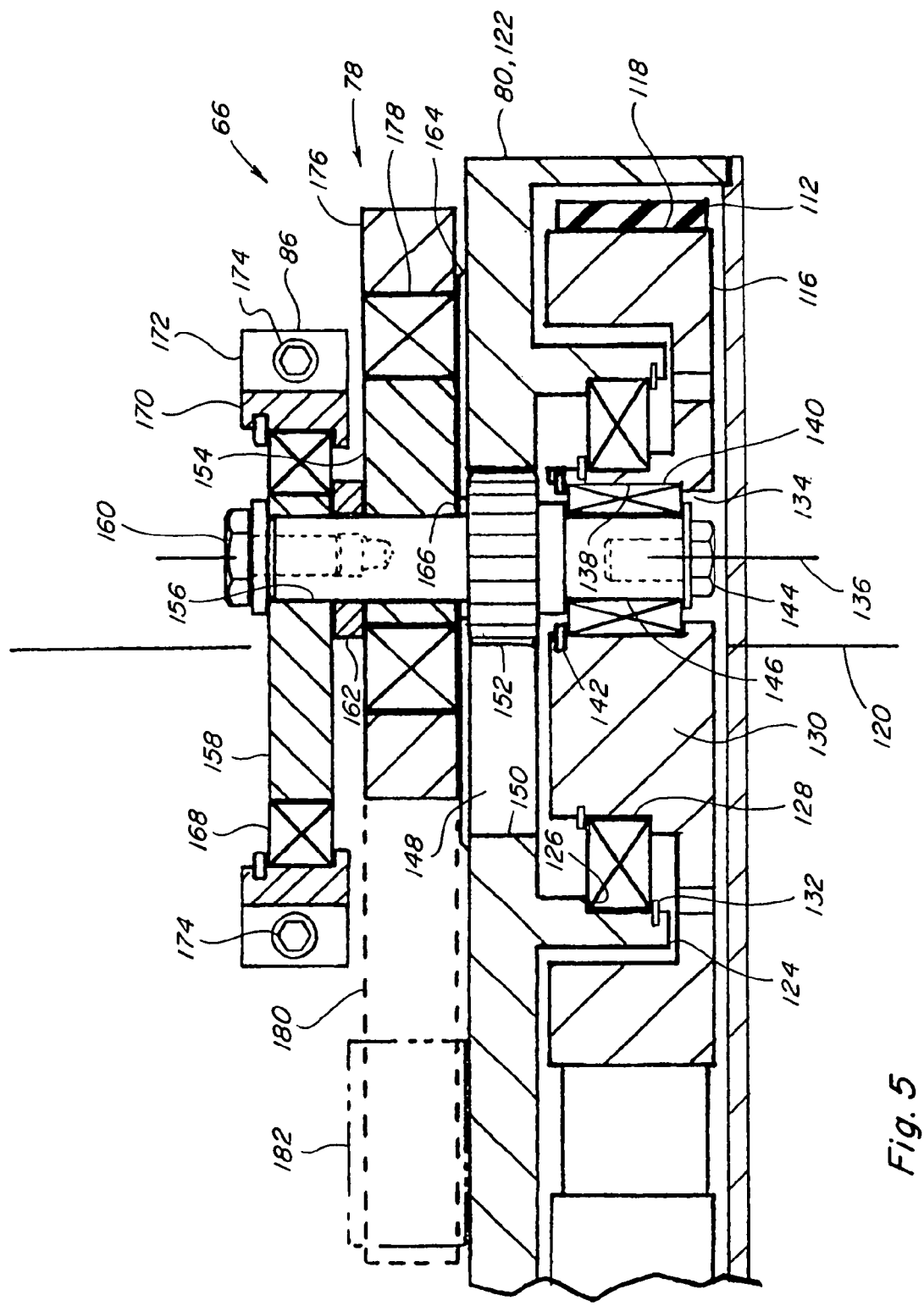
FIG. 5 is a fragmentary sectional view of a portion of the drive mechanism taken along line 5-5 of FIG. 4, illustrating internal aspects thereof.

Referring also to FIG. 5, a cross-sectional view of second epicyclic drive 78 illustrates the features thereof that enabled the vertical compactness of drive mechanism 66. Referring also to FIG. 6, another top view of sickle drive mechanism 66 is shown, illustrating aspects of mechanism 66 for operating drives 76 and 78 in timed relation. More particularly in this latter regard, input shaft 100 includes a cog belt sheave 110 partially encircled by a cogged timing drive belt 112. A pair of idler wheels 114 increase the wrap of belt 112 about sheave 110. Timing drive belt 112 is routed about the inner periphery of housing 80 to partially encircle an input element 116 of each of epicyclic drives 76 and 78. Here it should be noted that first and second epicyclic drives 76 and 78 share a common construction, but are timed differently such that, although rotated in the same direction by drive belt 112, first and second driver elements 68 and 70 will be simultaneously driven in opposite sideward directions, as will be explained. Input elements 116 of the respective drives 76 and 78 each comprise a flywheel having a cogged outer circumferential surface 118 engaged with cogged timing belt 112, as illustrated in FIG. 6c. Alternatively, a chain or gear drive, or a combination drive, could be used to accomplish a timed drive capability.

Input element 116 of each drive 76 and 78 is mounted for rotation about a central rotational axis 120 of the drive, on a fixed frame 122 of cast metal or other sturdy construction which is part of housing 80. This is achieved using a downwardly extending annular bearing flange 124 on frame 122, which defines a downwardly facing round cavity, and includes an inner circumferential bearing seat 126 into which a bearing 128 is suitably mounted and retained, for instance, using a snap ring 132. Central rotational axis 120 of each drive extends in and defines an axial direction for the drive. Input element 116 includes an inner hub 130 sized to be received in the downwardly open cavity and having an outer circumferential surface around which bearing 128 is retained, for instance, by a press fit, snap ring, or other suitable manner of mounting. Installation of ring 132 can be accomplished, for instance, using one or more holes that can be provided through input element 116, or in any other suitable manner. Hub 130 includes a hole 134 therein at a location offset from central rotational axis 120, and through which an eccentric axis 136, parallel to, but offset from rotational axis 120, extends. A bearing seat 138 extends around a portion of hole 134 and receives a bearing 140 which is suitably retained in position by a retainer ring 142, a press fit, or like.

The lower end of a pinion shaft 146 is received in pinion bearing 140 and secured thereto by a bolt 144 and a washer for rotation relative to input element 116, and extends upwardly through a central passage 148 extending through frame 122 and concentric about central rotational axis 120.

A ring gear 150 is fixedly mounted on or incorporated into frame 122 so as to extend around central passage 148. Pinion shaft 146 includes a pinion gear 152 enmeshed with ring gear 150, such that when input element 116 is rotated about central rotational axis 120, pinion gear 152 will cause pinion shaft 146 to rotate therewith about eccentric axis 136, while circling or orbiting about central rotational axis 120. Here, the internal pitch diameter of ring gear 150 is preferably selected to be equal to twice the pitch diameter of pinion gear 152, such that for each revolution of input element 116, pinion shaft 146 and pinion gear 152 about central rotational axis 120, pinion shaft 146 and gear 152 will be rotated two revolutions about eccentric axis 136.

Figure 5B:
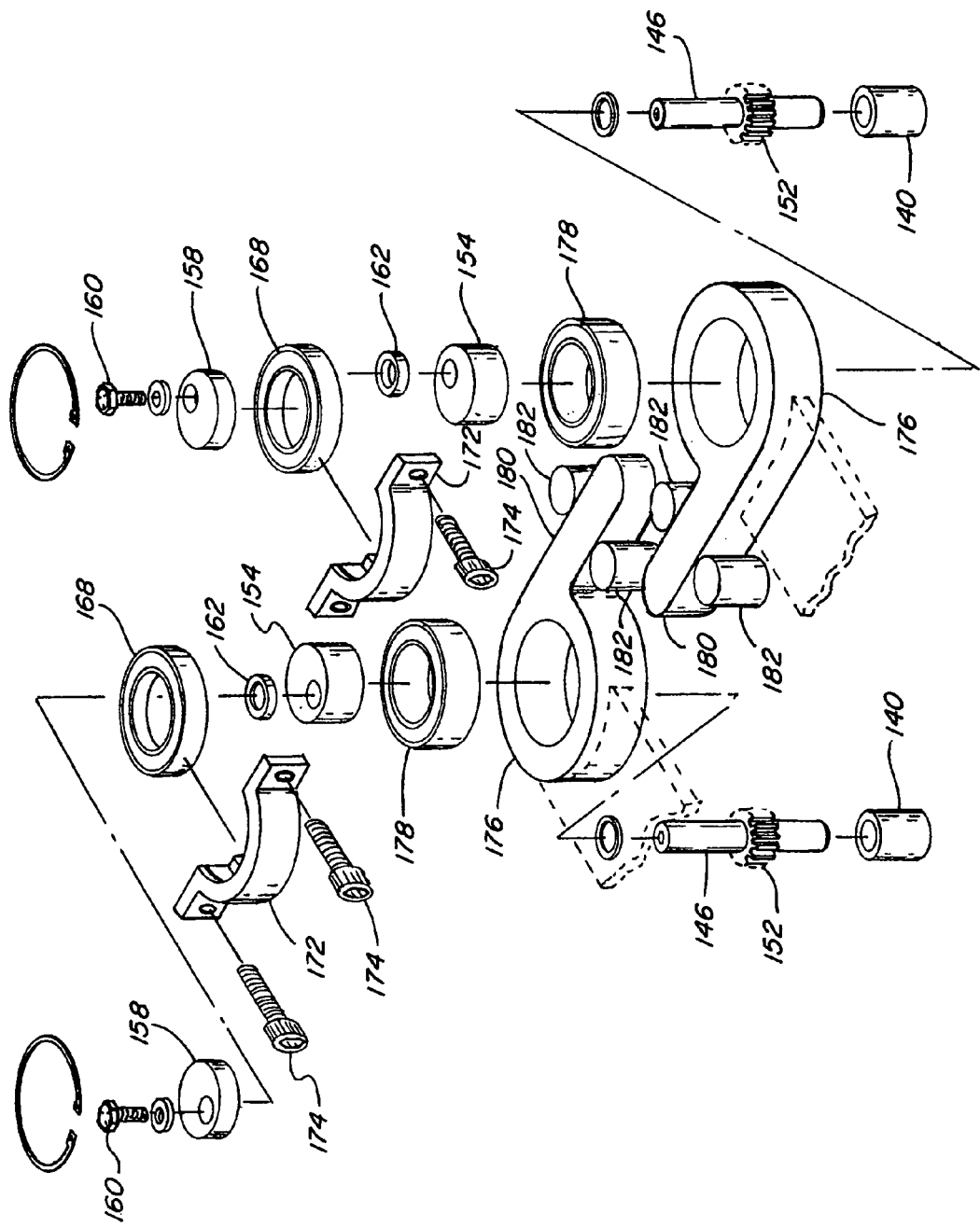
FIG. 5b is an exploded view of an upper portion of the drive mechanism.

Referring also to FIG. 5b, pinion shaft 146 extends upwardly above frame 122 so as to be located above housing 80, and an eccentric element 154 is mounted to the upwardly extending pinion shaft 146, also above housing 80. These elements can be viewed from above when upper bearing assembly 86 is removed, as shown in FIGS. 2 and 6. Eccentric element 154 is a round or disc shaped member and is mounted to pinion shaft 146 so as to be eccentric to eccentric axis 136 therethrough. Pinion shaft 146 also preferably extends above eccentric element 154 so as to be received in a hole 156 in an upper bearing plate 158 of upper bearing assembly 86. A bolt 160 threadedly engaged with the upper end of pinion shaft 146 retains upper bearing plate 158 and eccentric element 154 on shaft 146. A splined, a tri-lobe type, or other suitable connection would be used to position and maintain position of elements 154 and 158 relative to each other and to the pinion. A spacer 162 is disposed around pinion shaft 146 between eccentric element 154 and upper bearing plate 158. Additionally, also referring to FIG. 5a, a seal 164 and a shoulder or a spacer 166 extend around pinion shaft 146 in a space between eccentric element 154 and an upper surface of frame 122 of housing 80. Seal 164 is preferably a lip type seal and covers central passage 148, to limit or prevent entry of water, dust and other contaminants into central passage 148.

Referring more particularly to FIGS. 4, 5, and 5b, circular or disc shaped upper bearing plate 158 is retained by a bearing 168 supported in a fixed bearing frame 170 of upper bearing assembly 86 attached to housing 80, such that bearing plate 158 is rotatable about central rotational axis 120 concentric with input element 116. Fixed bearing frame 170 illustrated is a split or saddle type bearing frame having a semicircular bearing cap 172 held in place on frame 170 by bolts or cap screws 174, for holding bearing 168 in axial alignment with central rotational axis 120, although other suitable bearing structures can also be used. Here, it should be noted that in the sectional view of FIG. 5 pinion shaft 146, pinion gear 152, upper bearing plate 158 and bolt 160 are illustrated in a rotational position about central rotational axis 120 (as illustrated by bolt 160 in dotted lines in FIG. 4) which is rotated 90° counterclockwise from that represented by bolt 160 in solid lines in FIG. 4, so as to better illustrate the offset, eccentric relationship of those elements with respect to central rotational axis 120.

Referring more particularly also to FIG. 6, eccentric element 154 of each epicyclic drive 76 and 78 is circular or disc shaped and supports a knife head assembly 176 on a bearing 178, such that eccentric element 154 and assembly 176 are relatively rotatable in a plane perpendicular to axes 120 and 136. Assembly 176 includes an element supported on and extending about bearing 178, and rigidly connected to respective knife head driver element 68 or 70 which extends forwardly therefrom to connect with the respective knife head 60, the element including an arm portion 180 extending sidewardly between a pair of rollers 182 mounted externally on the top surface of housing 80. It should be observed that assemblies 176 are inverted mirror images of one another, such that arm portion 180 extend from opposite directions toward the center of drive mechanism 66. This is important, as will be explained. Rollers 182, in cooperation with the containment of knife assemblies 60 in the slots of guards 50, restrain assembly 176, driver elements 68 and 70, and knife assemblies 60 from forward and rearward movement, but allow sideward movement thereof toward both ends or sides of the header, even through the full range of rotation of eccentric elements 154. Since knife assemblies 60 are located some distance forward of sickle drive 66, and particularly of housing 80 and rotational axes 120, and are driven with considerable forces which can reach thousands of pounds, the forces from the acceleration and deceleration of knife assemblies 60 generate substantial force moments around axes 120. Such moments are restrained by arm portions 180 of knife head assemblies 176 through rollers 182 mounted to housing 80, keeping the forces contained within housing 80. Here, it should be noted that to achieve vertical compactness, concentric element 154, knife head assembly 176, and bearing 178, are at least generally vertically coextensive. Additionally, those elements preferably have a vertical extent of about 2 inches or less, and more preferably, of about 1 inch or less.

In FIG. 6, it should also be noted that knife assemblies 60 are illustrated in a mid-stroke position wherein guards 50 are disposed about equidistant between knife edges 62 of adjacent knife sections. In this position, eccentric element 154 of both drives 76 and 78 are about concentric with the central rotational axis 120 of the respective drive. However, pinion shaft 146 of drive 76 is illustrated disposed above (actually rearwardly of) central rotational axis 120 of that drive, whereas pinion shaft 146 of drive 78 is illustrated disposed below (forwardly of) central rotational axis 120 of that drive. This is important, as the position of pinion shaft 146 about central rotational axis 120 of each drive 76 or 78 will establish the direction of sideward movement and position of the respective knife assembly 60 connected to that drive. For the examples, belt 112 will be assumed to move in the clockwise direction denoted by arrow C at the top of the drawing. Here, it can be observed that eccentric element 154 will have a diametrical extent within the bounds of bearing 178 which at least equals the sideward extent of movement of the knife head, to accommodate the rotational movement of pinion shaft 146 which produces the sideward movement.

Figure 7:
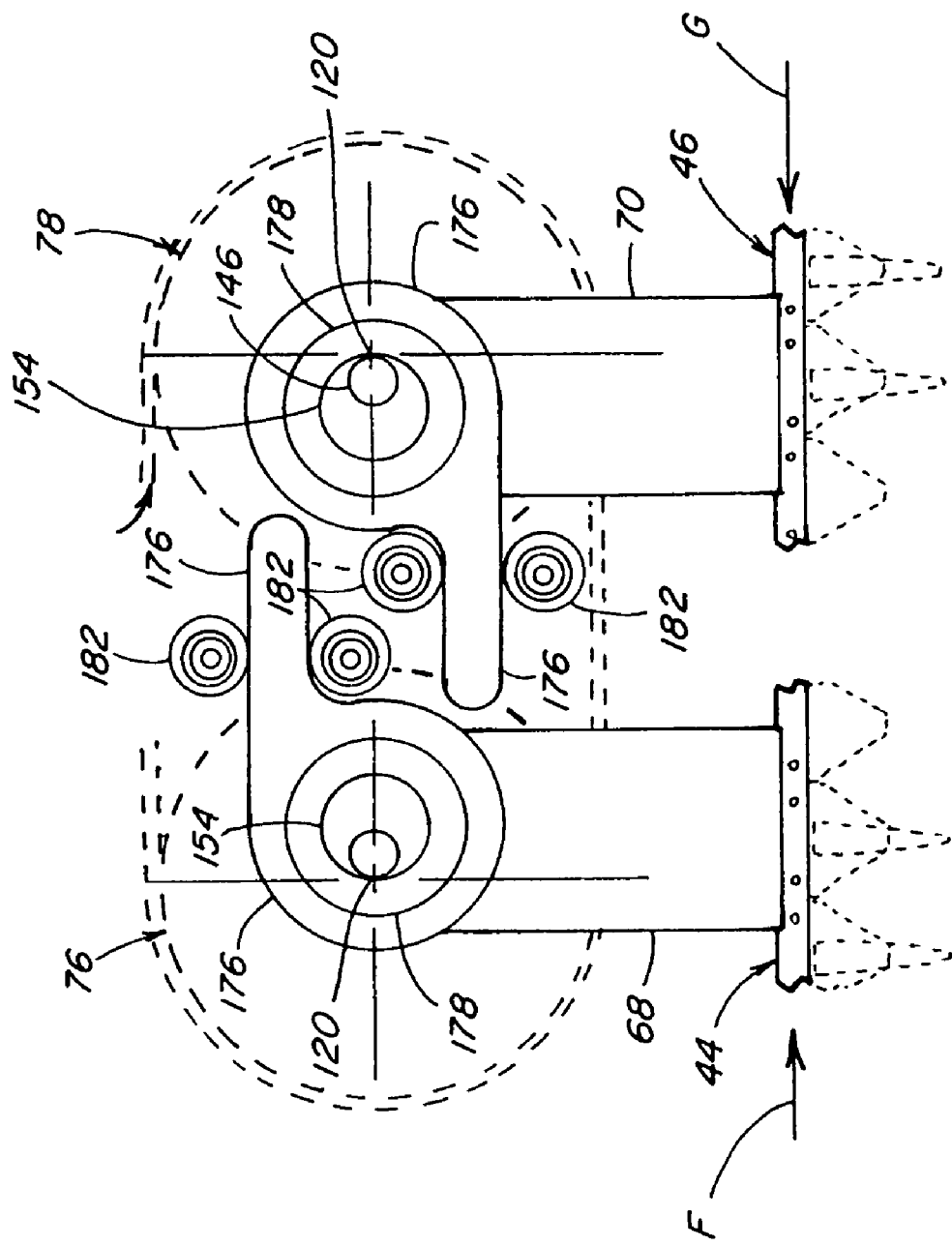
FIG. 7 is another top view of the drive mechanism of FIG. 1, illustrating elements thereof in a second representative operating position.
Figure 6B:
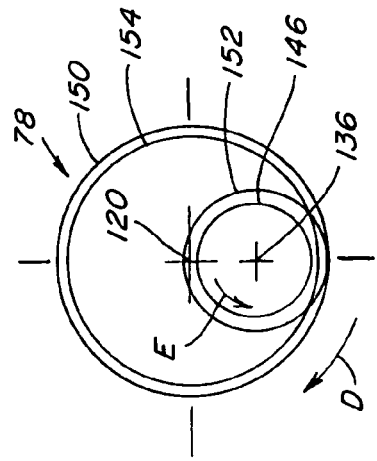
FIG. 6b is a simplified schematic top view of a pinion gear and ring gear and an eccentric element of the drive mechanism of FIG. 1 for the operating position of FIG. 6.
Figure 7B:
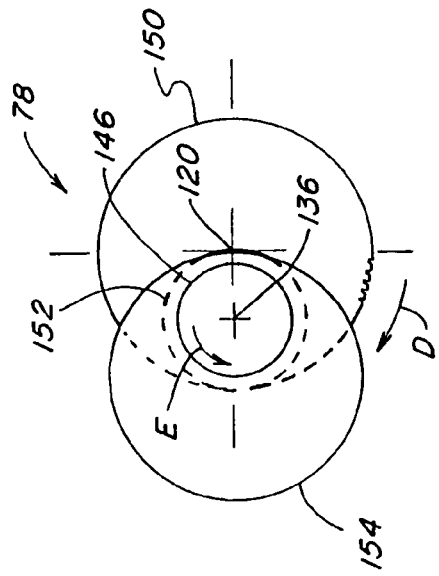
FIG. 7b is a simplified schematic top view of the pinion gear and ring gear and eccentric element of the drive mechanism of FIG. 7.
Figure 6A:
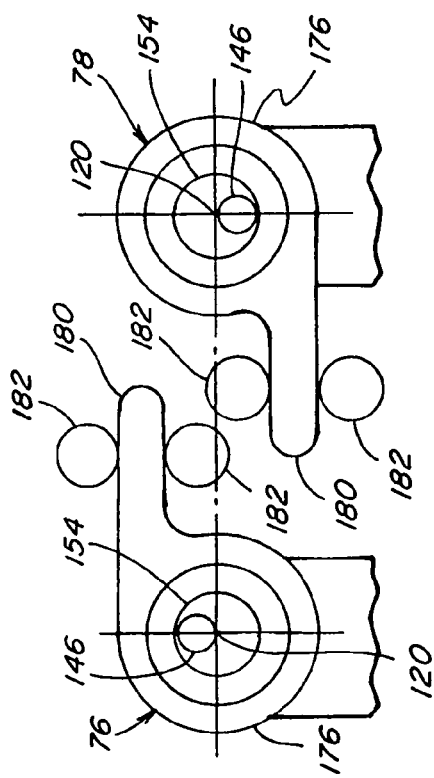
FIG. 6a is a simplified schematic top view of the drive mechanism of FIG. 1 in the operating position of FIG. 6.
Figure 7A:
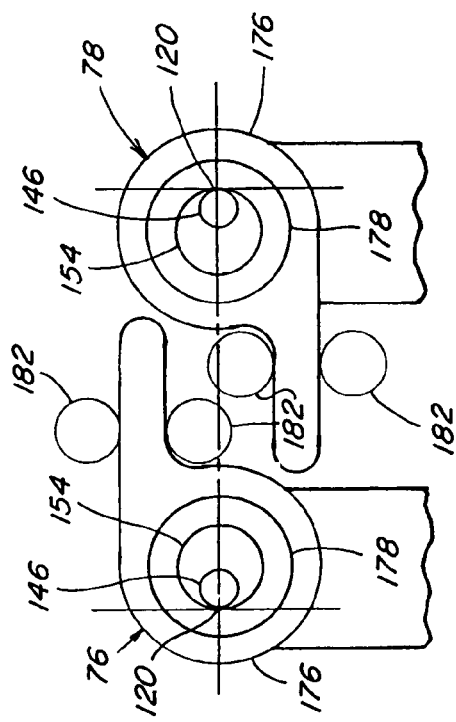
FIG. 7a is a simplified schematic top view of the drive mechanism of FIG. 7.

Referring also to FIG. 6*a*, knife head assemblies 176 of drives 76 and 78 are again illustrated in the mid-stroke position. Pinion shaft 146 of drive 76 is disposed directly above (rearwardly of) central rotational axis 120 of that drive. Pinion shaft 146 of drive 78 is disposed directly below (forwardly of) central rotational axis 120 of that drive. Arm portions 180 of both drives are about midway along their extents of travel in contact with their respective rollers 182. FIG. 6*b* is a schematic representation of the position of pinion shaft 146 of drive 78 when in the position shown in FIGS. 6 and 6*a*. Pinion gear 152 is shown engaged with ring gear 150, which it should be remembered, is concentric with central rotational axis 120. Eccentric element 154 of that drive is also concentric with axis 120. In this position, as pinion shaft 146 is caused to orbit or circle in the clockwise direction about central rotational axis 120, as denoted by arrow D, resulting from the rotation of input element 116 by belt 112 (FIG. 6) as explained earlier, pinion shaft 146 will be caused to rotate in the counterclockwise direction about eccentric axis 136 therethrough, as denoted by arrow E, as a result of the engagement of pinion gear 152 with ring gear 150. This will result in eccentric element 154 also being rotated counterclockwise in direction E, to the position shown in FIG. 7*b*. This also illustrated in FIGS. 7 and 7*a*. As a result of the restraint of knife head assemblies 176 so as to be movable sidewardly only, and the presence of bearings 178, eccentric elements 154 are allowed to rotate relative to the respective assembly 176, with the further result that assemblies 176 are displaced sidewardly. Here, knife head assembly 176 of drive 76 is displaced or stroked sidewardly inwardly toward the right as denoted by arrow F in FIG. 7, while knife head assembly 176 of drive 78 is displaced or stroked sidewardly inwardly toward the left, as denoted by arrow G. This position illustrated in FIG. 7 represents the maximum inward extent of the cutting strokes of knife assemblies 60. Referring to FIGS. 6*a* and 7, movement in directions F and G (FIG. 7) results in generation of moments against rollers 182, as a result of knife assemblies 60 being located forward of sickle drive 66 and the considerable forces required for acceleration and deceleration of the long knife assemblies, and opposition generated by the cutting action and friction, which moment forces can reach thousands of pounds and will be contained within the structure of the drive.

Figure 8A:
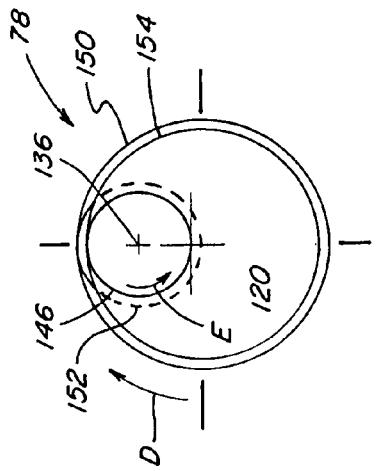
FIG. 8a is a simplified schematic top view of the pinion gear, ring gear and eccentric element of the drive mechanism of FIG. 8.
Figure 8:
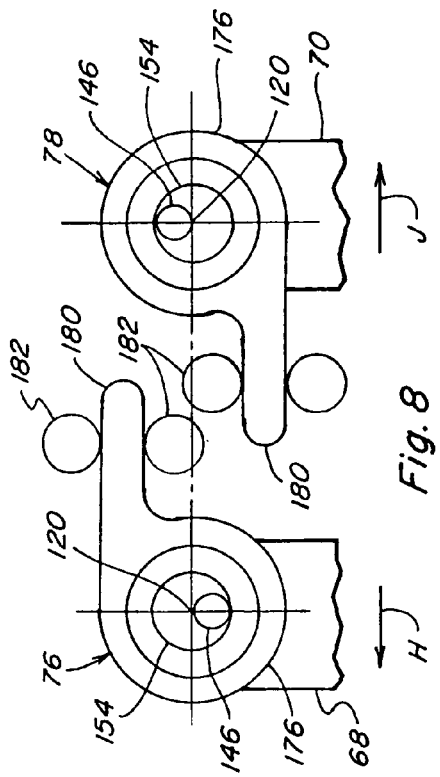
FIG. 8 is a simplified schematic top view of the drive mechanism of FIG. 1, illustrating elements thereof in a third representative operating position.

Referring also to FIGS. 8 and 8*a*, knife head assemblies 176 of drives 76 and 78 are again illustrated in the mid-stroke position, after continued movement of pinion shafts 146 in direction D about axis 120, as effected by continued rotation of input elements 116 in direction C (FIG. 6). This, in turn, effects a corresponding reversal of the sideward directions of movement of knife head driver elements 68 and 70 to a sideward outward direction (arrows H and J), from those shown in FIG. 7 (arrows F and G). Arm portions 180 of both drives are about midway along their extents of travel in contact with their respective rollers 182, such that the knife assemblies will be positioned as illustrated in FIG. 6. In FIG. 8*b*, pinion gear 152 of drive 78 has continued rotation in direction E about axis 136 around ring gear 150 and axis 120, and eccentric element 154 of that drive is also again concentric with axis 120. Again, eccentric elements 154 are allowed to rotate relative to the respective knife head assembly 176, with the result that assemblies 176 are displaced sidewardly only. During this direction of movement, moment forces are generated in the opposite directions against rollers 182 compared to those shown in FIG. 6*a*, as denoted in FIG. 8, which moments will be contained within the structure of the drive.

Figure 9B:
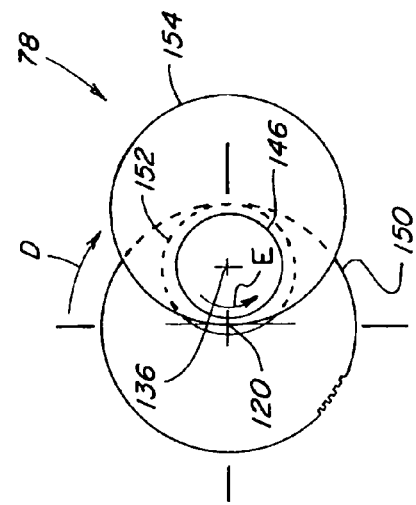
FIG. 9b is a simplified schematic top view of the pinion gear, ring gear and eccentric element of the drive mechanism of FIG. 9.
Figure 9A:
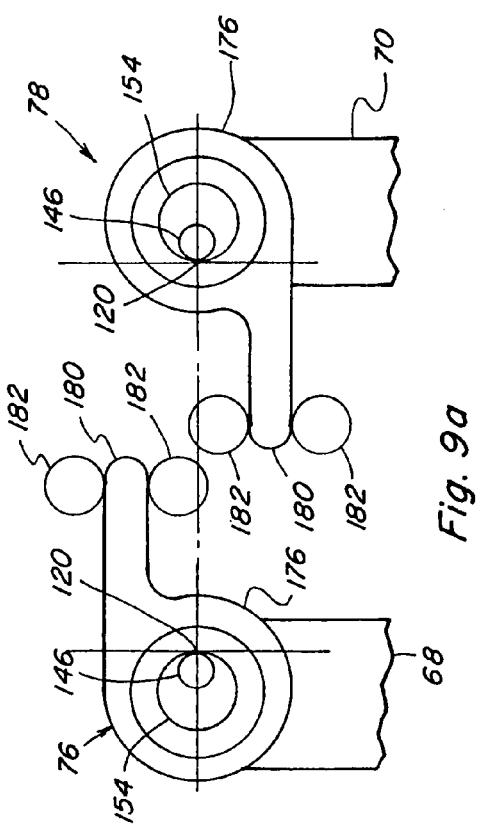
FIG. 9a is a simplified schematic top view of the pinion gear, ring gear and eccentric element of the drive mechanism of FIG. 9.
Figure 9:
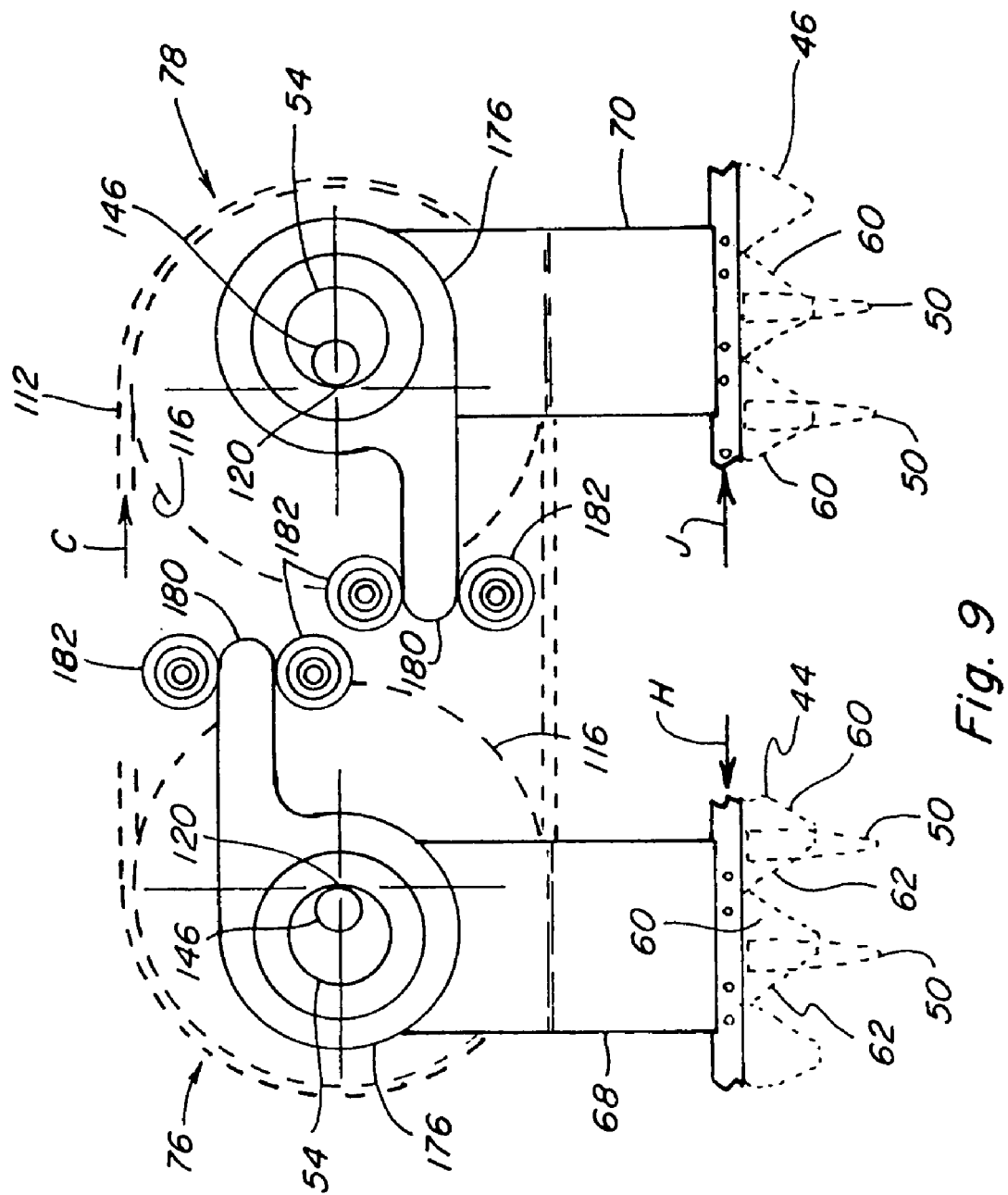
FIG. 9 is another top view of the drive mechanism of FIG. 1, illustrating elements thereof in another representative operating position.

Turning to FIGS. 9, 9*a* and 9*b*, knife head assemblies 176 of drives 76 and 78 are now illustrated moved further in the sideward outward directions H and J to their sideward outermost positions, as a result of further continued movement of pinion shafts 146 in direction D about axis 120, as effected by continued rotation of input elements 116 in direction C. Arm portions 180 of both drives are at their farthest outward extents of travel in contact with their respective rollers 182. Knife assemblies 60 are illustrated in about an outward end of their strokes after passage of the knife edges 62 through guards 50 in an outward cutting stroke. In FIG. 9*b*, pinion gear 152 of drive 78 has continued rotation in direction E about axis 136 around ring gear 150 and axis 120, and eccentric element 154 of that drive is shifted sidewardly outwardly of axis 120. Again, eccentric elements 154 are allowed to rotate relative to the respective assembly 176, with the result that assemblies 176 are displaced sidewardly only. With continued movement of pinion shafts 146 in direction D about axis 120, as effected by continued rotation of input elements 116 in direction C, the elements of drives 76 and 78 will return to the positions illustrated in FIG. 6, and thus completing a complete revolution of pinion shafts 146 about central rotational axes 120, which corresponds to a complete revolution of input elements 116 of the drives.

Here, as an advantage of the invention, it should be apparent that knife head assemblies 176 and driver elements 68 and 70 are moved by drives 76 and 78 in opposite sideward directions, such that sideward forces exerted respectively thereby are at least substantially canceled. Additionally, forces generated by eccentric movements of respective eccentric plates 158 will at least substantially cancel one another, as the eccentric movements are in opposite directions. Additionally, the structure of the drives is strong and robust, so as to be capable of containing forces resulting from the moments generated by the accelerations and decelerations of the knife assemblies, which can be substantial. As a result, vibrations and forces exerted by drive mechanism 66 against supporting framework, such as frame 58 of header 22, will be minimal.

Figure 1B:
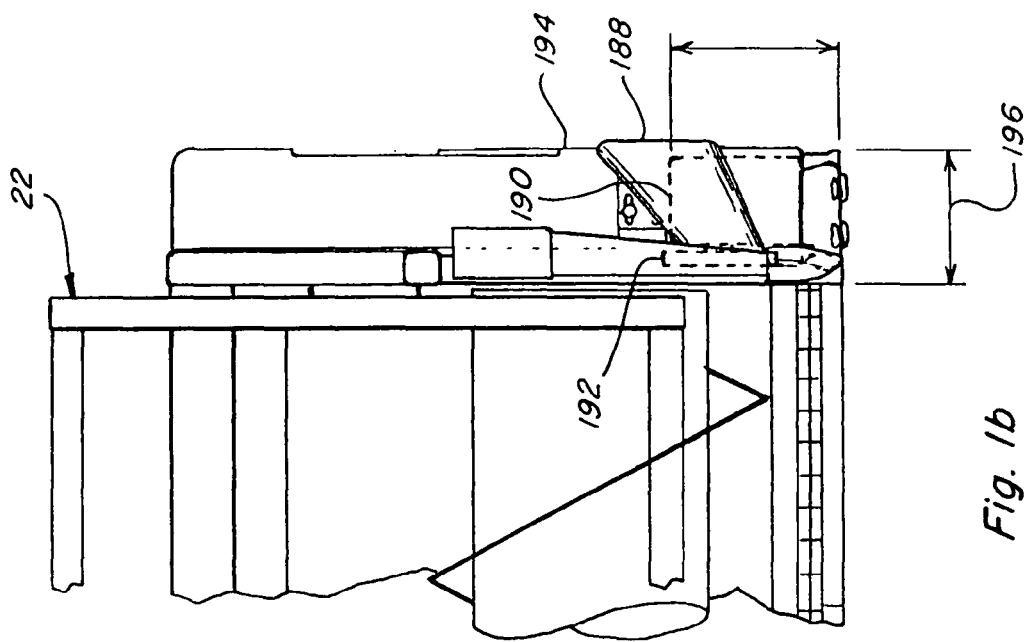
FIG. 1b is an enlarged fragmentary forward end view of the end of the header of FIG. 1 including a prior art sickle drive.
Figure 1A:
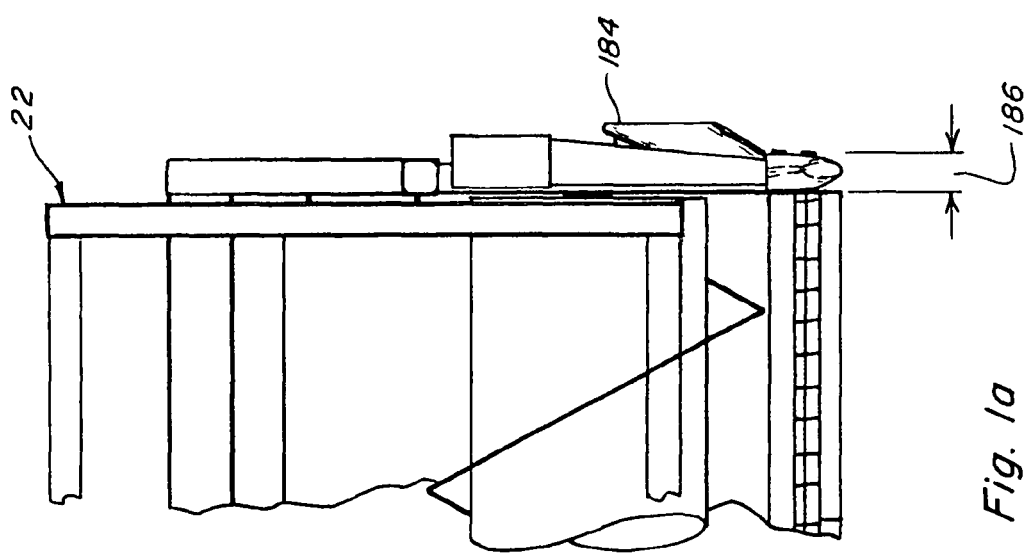
FIG. 1a is an enlarged fragmentary forward end view of an end of the header of FIG. 1.

Referring also to FIGS. 1*a* and 1*b*, as another advantage, because the compact sickle drive mechanism of the invention can be mounted between the side or end portions of a header as illustrated herein, the space on the side of the header where the sickle drive would otherwise be located can be eliminated, such that the width of the crop divider on that side can be significantly reduced. This is illustrated in FIG. 1*a*, wherein a conventional crop divider 184 is used that contains no sickle drive. Crop divider 184 will have an overall width 186 of about 4 inches. In contrast, a conventional prior art crop divider 188 is illustrated, which is sufficiently wide to accommodate a conventionally constructed and located wobble drive 190, a drive belt sheave 192 for powering drive 190, and a cover 194. A typical overall width for an arrangement such as this, denoted by width 196, will be from about 8 to about 10 inches. As a result, when a header, such as header 22, utilizing a drive mechanism of the invention is driven through a field of standing crop for harvesting a swath of the crop, the narrower width of crop divider 184 compared to divider 188 will reduce the amount of crop that may be pushed down by the divider and possibly lost. Here, it can be observed that a typical wobble drive, such as drive 190, can have an overall height of 12-15 inches, which is about twice or more than the overall height of the drive of the invention.

The more central location of the drive mechanism of the invention, and the force canceling capability thereof, also provides the advantage of requiring less support structure at the sides of the header.

Further, it should be noted that directional references herein, including forward, rearward, sideward, upward and downward, are for reference purposes only, and are not intended to limit the present invention to any particular orientation or in any way.

Figure 10:
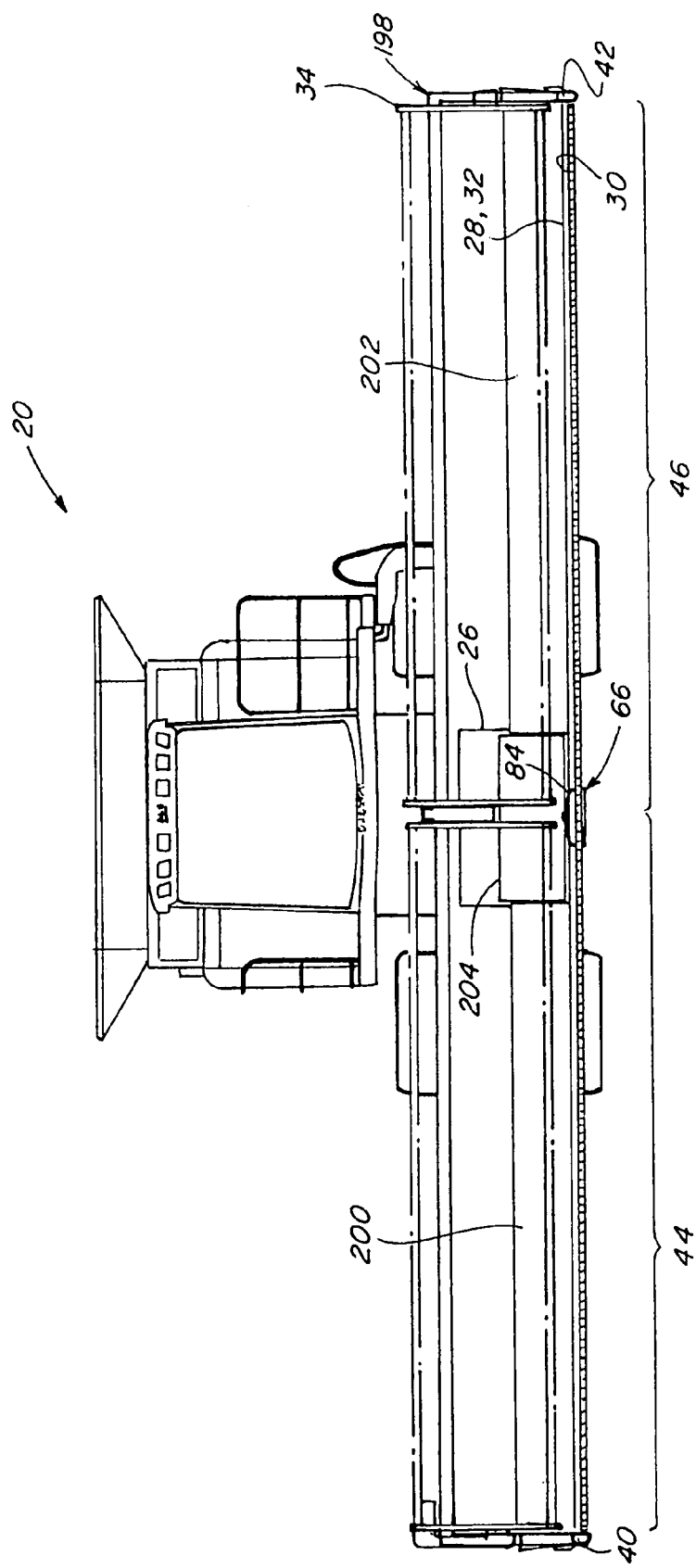
FIG. 10 is a forward end view of the combine of FIG. 1 including a header having a compact sickle drive mechanism according to the present invention.

Still further, in FIG. 10 combine 20 is shown including an alternative header 198 which is a representative draper type header, including a compact sickle drive mechanism 66 constructed and operable according to the teachings of the present invention, like parts of header 198 and header 22 being identified by like numerals. Draper header 198 includes a sickle 30 extending across a forward edge portion 32 of a floor 28, between first and second side edge portions 40 and 42 of the floor. Sickle 30 is composed of a first cutter bar assembly 44 in end to end relation with a second cutter bar assembly 46. A reel 34 is disposed above sickle 30. A pair of elongate draper belts 200 and 202 extended sidewardly along and form a portion of floor 28, and are movable toward the center of the header for conveying cut crops through a crop conveying area to a center belt 204 operable for conveying the crop rearwardly into a mouth or inlet opening of a feeder 26 of combine 20. Compact sickle drive mechanism 66 of header 198 is constructed and operable in the above-described manner, and provides all of the features and advantages of sickle drive mechanism 66 of header 22. Here, it can be observed that upper cover 84 of compact sickle drive 66 is streamlined and has a low profile so as to be substantially unobtrusive to crop flow over floor 28.

Figure 11:
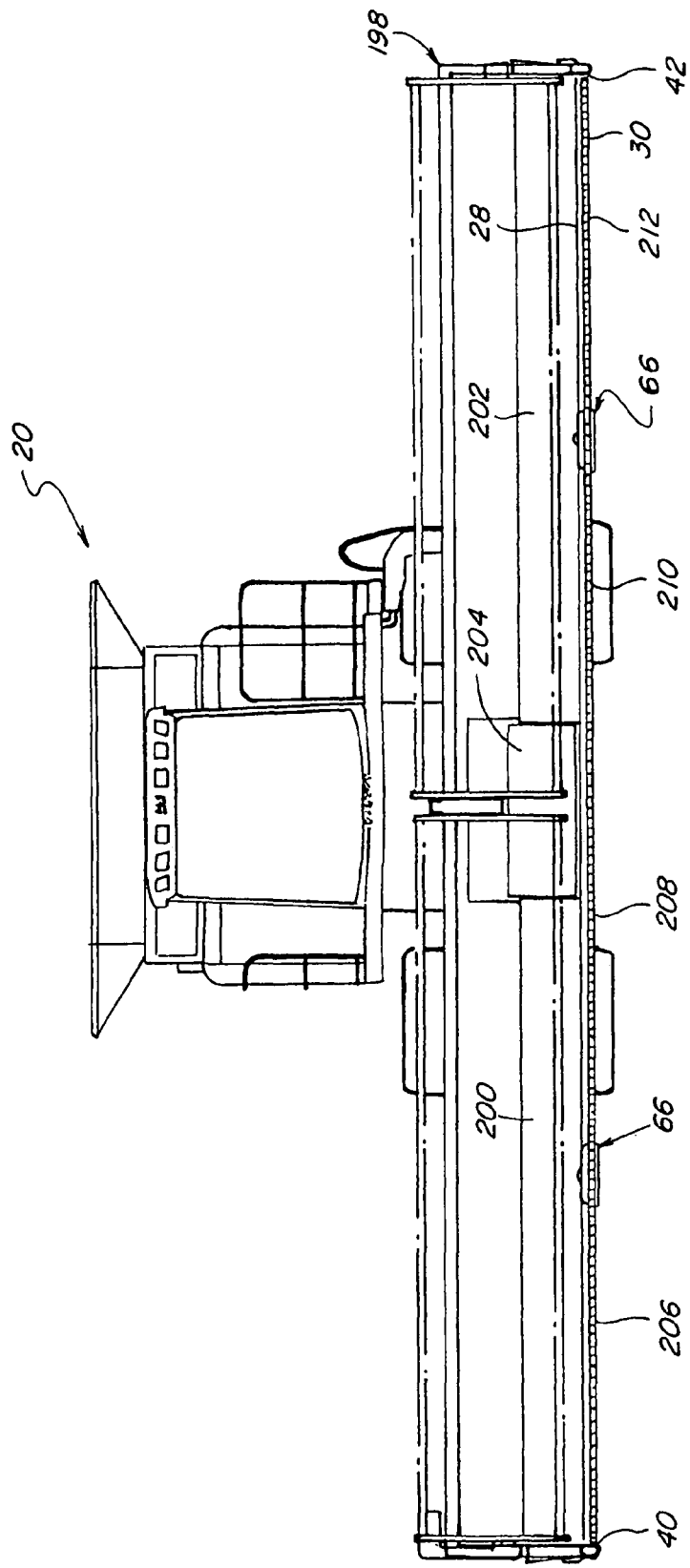
FIG. 11 is a forward end view of the combine of FIG. 1 including a header utilizing two compact sickle drive mechanisms of the invention.
Figure 12:
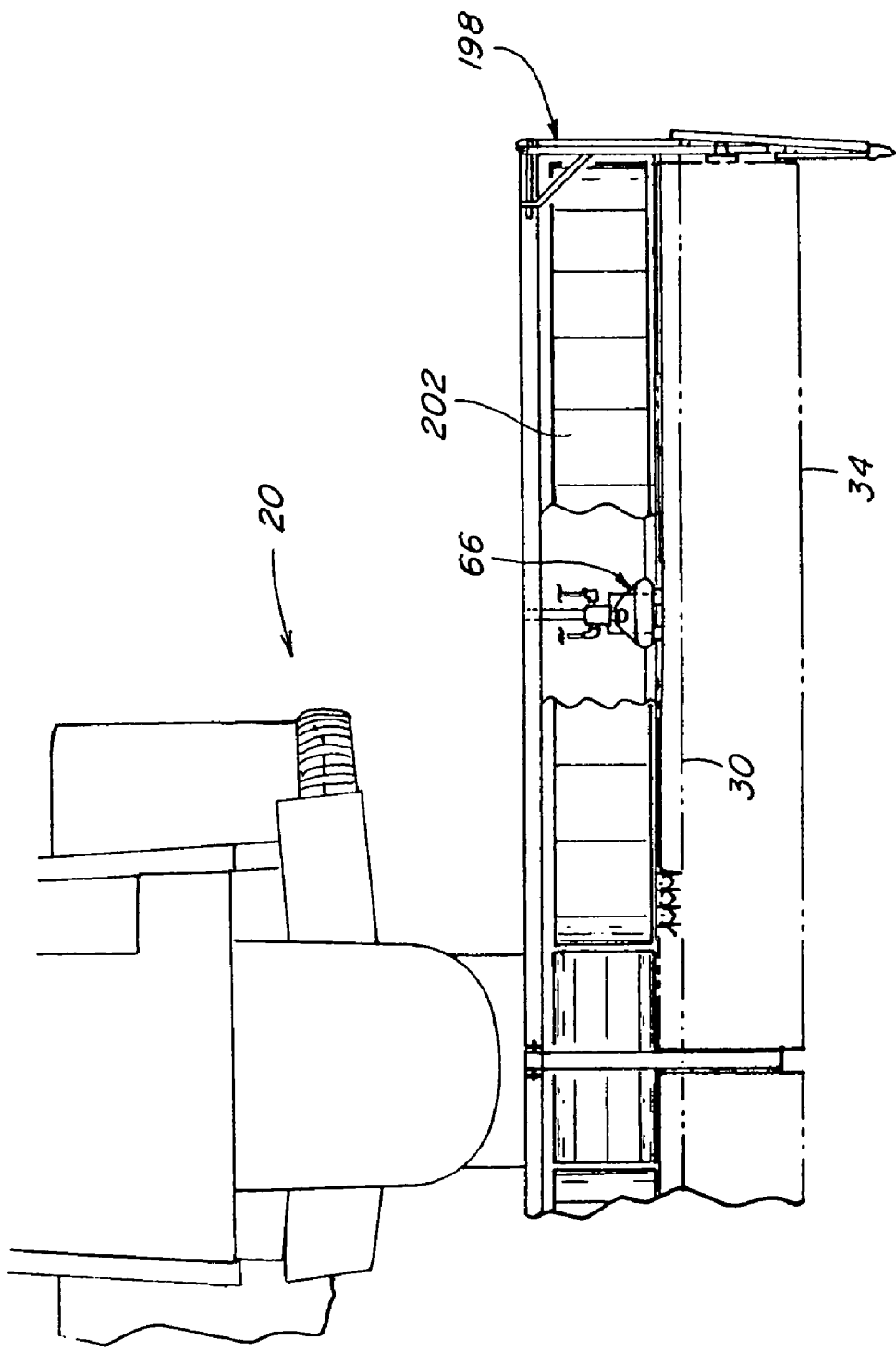
FIG. 12 is a fragmentary top view of the combine of FIG. 11, with a portion of a draper belt thereof removed to reveal a sickle drive mechanism of the invention.

In FIGS. 11 and 12, draper header 198 is illustrated including and configured for use of two compact sickle drives 66 constructed and operable according to the teachings of the present invention, like parts of this header 198 and previous headers 22 and 198 being identified by like numerals. Here, sickle 30 of draper header 198 is comprised of four cutter bar assemblies 206, 208, 210 and 212 extending in end to end relation between edge portions 40 and 42 of a floor 28 of the header. Cutter bar assemblies 206 and 208 are connected in reciprocating sideward driven relation to compact sickle drive 66 on the left side of the machine as viewed in the drawing, and cutter bar assemblies 210 and 212 are connected in reciprocating sideward driven relation to drive 66 on the right side. Drives 66 are constructed and operable as described above. Here, it can be observed in reference to FIG. 12 that drives 66 are supported beneath draper belts 200 and 202. The location of reel 34 above sickle 30 is also illustrated in FIG. 12. Thus, it should be apparent that compact sickle drive mechanisms of the invention can be used with a wide variety of header constructions.

In FIG. 13, a conventional agricultural windrower 214 is illustrated including a header 216 including a compact sickle drive mechanism 66 constructed and operable according to the teachings of the present invention, like parts of header 216 and headers 22 and 198 being identified by like numerals. Header 216 includes a sickle 30 extending along a forward edge portion of a floor 28, and a reel 34 disposed generally above sickle 30. Sickle 30 and reel 34 are constructed and operable similarly to those items of header 22. In particular, sickle 30 includes a first cutter bar assembly 44 and a second cutter bar assembly 46, both connected in reciprocating sideward driven relation to drive mechanism 66. Mechanism 66 is incorporated into floor 28 in essentially the same manner as described in reference to header 22 above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An epicyclic drive of a sickle, the epicyclic drive disposed within a housing, the epicyclic drive comprising:
   an input element supported for rotation about a central rotational axis therethrough;
   a pinion shaft extending through the housing, the pinion shaft having a longitudinal axis concentric with an eccentric axis, the eccentric axis offset and parallel to the central rotational axis;
   a pinion gear supported on the pinion shaft such that when the input element is rotated about the central rotational axis, the pinion gear will cause the pinion shaft to rotate therewith about the eccentric axis;
   a fixed ring gear concentric with the central rotational axis and enmeshed with the pinion gear such that rotation of the input element about the central rotational axis will cause the pinion gear to rotate around the ring gear about the central rotational axis and simultaneously rotate about the eccentric axis, wherein rotation of the pinion gear causes the pinion shaft to orbit in a first direction around the central rotational axis while simultaneously rotating about the eccentric axis in a second and opposite direction;
   an eccentric element mounted to the pinion shaft so that a central axis of the eccentric element is eccentric to the eccentric axis, wherein the eccentric element orbits about the ring gear and the central rotational axis when the input element is rotated, while simultaneously rotating about the eccentric axis in the second direction;
   a knife head bearing supported on and extending around the eccentric element; and
   a knife head assembly connected to a sickle knife assembly, the knife head assembly including an element supported on and extending around the knife head bearing and configured so as to transfer sidewardly directed components of rotations of the eccentric element into sideward reciprocating movements of the sickle knife assembly.

2. The drive of claim 1, wherein the eccentric element, the knife head bearing, and the knife head assembly are all generally flat and coplanar.

3. The drive of claim 1, wherein the central rotational axis defines an axial direction, and the eccentric element, the knife head bearing, and the knife head assembly are all generally coextensive in the axial direction.

4. The drive of claim 1, wherein the eccentric element has a radial extent which is at least equal to an extent of reciprocating movement of the sickle knife assembly.

5. The drive of claim 1, wherein the input element, the pinion gear, and the ring gear are supported by a frame of a header for an agricultural harvesting machine, and the sickle knife assembly extends along a front edge portion of the floor.

6. The drive of claim 5, further comprising a cover mounted to the eccentric element so as to be movable therewith, the cover being disposed in covering relation to a cavity defined by the ring gear.

7. The drive of claim 1, further comprising:
a second input element supported for rotation about a second central rotational axis therethrough, the input elements being supported in side by side relation;
a second pinion gear supported in connection with the second input element for rotation relative thereto about a second eccentric axis offset from and parallel to the second central rotational axis;
a second fixed ring gear concentric with the second input element and enmeshed with the second pinion gear such that rotation of the second input element about the second central rotational axis will cause the second pinion gear to rotate around the second ring gear about the second central rotational axis and simultaneously rotate about the second eccentric axis;
a second eccentric element fixedly connected to the second pinion gear so as to be rotated thereby about the second ring gear and the second central rotational axis when the second input element is rotated;
a second knife head bearing supported on and extending around the second eccentric element; and
a second knife head assembly connected to a second sickle knife assembly, the second knife head assembly including an element supported on and extending around the second knife head bearing and in connection with the second sickle knife assembly and configured so as to transfer sidewardly directed components of rotations of the second eccentric element into sideward reciprocating movements of the second sickle knife assembly.

8. The drive of claim 7, wherein the input elements are commonly driven, and the eccentric elements are configured such that the knife head assemblies are driven in opposite directions.

9. An epicyclic drive of a sickle, the epicycylic drive disposed within a housing, the epicyclic drive comprising:
an input element supported for rotation about a central rotational axis therethrough, the central rotational axis defining an axial direction;
a pinion shaft extending through the housing, the pinion shaft having a longitudinal axis concentric with an eccentric axis, the eccentric axis offset and parallel to the central rotational axis;
a pinion gear supported on the pinion shaft such that when the input element is rotated about the central rotational axis, the pinion gear will cause the pinion shaft to rotate therewith about the eccentric axis;
a fixed ring gear concentric with the central rotational axis and enmeshed with the pinion gear such that rotation of the input element about the central rotational axis will cause the pinion gear to rotate around the ring gear about the central rotational axis and simultaneously rotate about the eccentric axis, wherein rotation of the pinion gear causes the pinion shaft to orbit in a first direction around the central rotational axis while simultaneously rotating about the eccentric axis in a second and opposite direction;
an eccentric element mounted to the pinion shaft so that a central axis of the eccentric element is eccentric to the eccentric axis, wherein the eccentric element orbits about the ring gear and the central rotational axis when the input element is rotated, while simultaneously rotating about the eccentric axis in the second direction;
a knife head bearing supported on and extending around the eccentric element; and
a knife head assembly connected to a sickle knife assembly, the knife head assembly including an element supported on and extending around the knife head bearing and configured so as to transfer sidewardly directed components of rotations of the eccentric element into sideward reciprocating movements of the sickle knife assembly when the input element is rotated, wherein the eccentric element, the knife head bearing, and the knife head assembly are generally coextensive in the axial direction.

10. The drive of claim 9, wherein the eccentric element, the knife head bearing, and the knife head assembly have an extent in the axial direction of less than about 2 inches.

11. The drive of claim 9, wherein the eccentric element has a radial extent which is at least equal to an extent of reciprocating movement of the sickle knife assembly.

12. The drive of claim 9, wherein the input element, the pinion gear, and the ring gear are supported by a frame of a header for an agricultural harvesting machine, and the sickle knife assembly extends along a front edge portion of the floor.

13. The drive of claim 12, further comprising a cover mounted to the eccentric element so as to be movable therewith, the cover being disposed in covering relation to a cavity defined by the ring gear.

14. The drive of claim 9, further comprising:
a second input element supported for rotation about a second central rotational axis therethrough, the input elements being supported in side by side relation;
a second pinion gear supported in connection with the second input element for rotation relative thereto about a second eccentric axis offset from and parallel to the second central rotational axis;
a second fixed ring gear concentric with the second input element and enmeshed with the second pinion gear such that rotation of the second input element about the second central rotational axis will cause the second pinion gear to rotate around the second ring gear about the second central rotational axis and simultaneously rotate about the second eccentric axis;
a second eccentric element fixedly connected to the second pinion gear so as to be rotated thereby about the second ring gear and the second central rotational axis when the second input element is rotated;
a second knife head bearing supported on and extending around the second eccentric element; and
a second knife head assembly connected to a second sickle knife assembly, the second knife head assembly being supported on and extending around the second knife head bearing, and the second knife head assembly being configured so as to transfer sidewardly directed components of rotations of the second eccentric element into sideward reciprocating movements of the second sickle knife assembly when the second input element is rotated.

15. The drive of claim 14, wherein the input elements are commonly driven, and the eccentric elements are in timed relation one to the other such that the sideward reciprocating movements of the knife assemblies will be at least substantially in opposite sideward directions and such that sideward forces exerted by the movements will at least substantially cancel one another.

16. Sickle apparatus for a header for an agricultural plant cutting machine, comprising:
an elongate first knife assembly supported adjacent to a sidewardly extending first forward edge portion of a floor of the header for reciprocal sideward movement therealong;
an elongate second knife assembly supported adjacent to a sidewardly extending second forward edge portion of the floor of the header for reciprocating sideward movement therealong in generally end to end relation to the first knife assembly; and a compact sickle drive mechanism including a first epicyclic drive drivingly connected to the first knife assembly and operable for reciprocatingly moving the first knife assembly sidewardly relative to the first forward edge portion of the floor, and a second epicyclic drive drivingly connected to the second knife assembly and operable for reciprocatingly moving the second knife assembly sidewardly relative to the second forward edge portion of the floor, the compact sickle drive mechanism being supported and located at least substantially beneath a portion of the floor spaced from opposite sides of the header, each of the epicyclic drives disposed within a housing, each epicyclic drive including an input element supported for rotation about a central rotational axis therethrough, a pinion shaft extending through the housing, the pinion shaft having a longitudinal axis concentric with an eccentric axis, the eccentric axis offset and parallel to the central rotational axis; a pinion gear supported on the pinion shaft such that when input element is rotated about central rotational axis, pinion gear will cause pinion shaft to rotate therewith about eccentric axis, a fixed ring gear concentric with the central rotational axis and enmeshed with the pinion gear such that rotation of the input element about the central rotational axis will cause the pinion gear to rotate around the ring gear about the central rotational axis and simultaneously rotate about the eccentric axis, wherein rotation of the pinion gear causes the pinion shaft to orbit in a first direction around the central rotational axis while simultaneously rotating about the eccentric axis in a second and opposite direction, an eccentric element mounted to the pinion shaft so that a central axis of the eccentric element is eccentric to the eccentric axis, wherein the eccentric element orbits about the ring gear and the central rotational axis when the input element is rotated, while simultaneously rotating about the eccentric axis in the second direction, a knife head bearing supported on and extending around the eccentric element, and a knife head driver assembly connected in driving relation to the sickle knife assembly to which the epicyclic drive is drivingly connected, the knife head assembly including an element supported on and extending around the knife head bearing and connected to the sickle knife assembly and configured so as to transfer sidewardly directed components of rotations of the eccentric element into sideward reciprocating movements of the sickle knife assembly connected thereto.

17. Sickle apparatus of claim 16, wherein the first and second epicyclic drives are jointly driven.

18. Sickle apparatus of claim 16, wherein the first and second epicyclic drives are supported in side by side relation beneath the floor.

19. Sickle apparatus of claim 16, wherein the first and second knife assemblies and the sickle drive mechanism are supported on the header for joint vertical movement relative to the floor of the header.

20. Sickle apparatus of claim 16, wherein the knife head bearing, the eccentric element, and the knife head assembly of each of the epicyclic drives are generally flat and vertically coextensive.

21. Sickle apparatus of claim 16, wherein the eccentric element, the knife head bearing, and the knife head assembly of each of the epicyclic drives have a vertical extent of less than about 2 inches.

22. Sickle apparatus of claim 16, wherein the eccentric element of each of the epicyclic drives has a radial extent which is at least equal to an extent of reciprocating movement of the sickle knife assembly driven thereby.

* * * * *